US006754622B1

(12) United States Patent
Beser et al.

(10) Patent No.: US 6,754,622 B1
(45) Date of Patent: Jun. 22, 2004

(54) METHOD FOR NETWORK ADDRESS TABLE MAINTENANCE IN A DATA-OVER-CABLE SYSTEM USING DESTINATION REACHIBILITY

(75) Inventors: Nurettin B. Beser, Evanston, IL (US); John G. Fijolek, Naperville, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/317,588

(22) Filed: May 24, 1999

(51) Int. Cl.[7] ............................................ G06F 15/177
(52) U.S. Cl. ...................... 704/226; 709/245; 370/485
(58) Field of Search ................................. 709/223, 224, 709/220, 221; 370/254, 255; 320/352, 485, 401; 704/250, 245

(56) References Cited

U.S. PATENT DOCUMENTS

| | | | |
|---|---|---|---|
| 4,644,533 A | 2/1987 | Braff et al. ................... 370/94 |
| 4,881,263 A | 11/1989 | Herbison et al. ........... 713/162 |
| 4,996,685 A | 2/1991 | Farese et al. .............. 370/58.1 |
| 5,014,234 A | 5/1991 | Edwards, Jr. | |
| 5,138,712 A | 8/1992 | Corbin | |
| 5,301,273 A | * 4/1994 | Konishi ...................... 395/200 |
| 5,347,304 A | 9/1994 | Moura | |
| 5,430,727 A | 7/1995 | Callon ..................... 370/85.13 |
| 5,442,749 A | 8/1995 | Northcutt et al. | |
| 5,488,412 A | 1/1996 | Majeti | |
| 5,489,897 A | 2/1996 | Inoue | |
| 5,528,595 A | 6/1996 | Walsh et al. ............. 370/85.13 |
| 5,583,931 A | 12/1996 | Schneider | |
| 5,586,121 A | 12/1996 | Moura | |
| 5,598,410 A | 1/1997 | Stone | |
| 5,600,717 A | 2/1997 | Schneider | |
| 5,606,606 A | 2/1997 | Schneider | |
| 5,608,446 A | 3/1997 | Carr | |
| 5,610,910 A | 3/1997 | Focsaneanu et al. ........ 370/351 |
| 5,623,542 A | 4/1997 | Schneider | |
| 5,623,601 A | 4/1997 | Vu | |
| 5,636,211 A | 6/1997 | Newlin | |
| 5,675,732 A | 10/1997 | Majeti | |
| 5,675,742 A | 10/1997 | Jain et al. ................... 395/200 |

(List continued on next page.)

FOREIGN PATENT DOCUMENTS

WO     WO 00/67385     11/2000

OTHER PUBLICATIONS

"Baseline Privacy Interface Specification (Interim) SP–B–PI–I01–970922", MCNS Holdings, L.P., 1997, pp. ii to 65.
"Security System Specification (Interim Specification) SP–SSI–I01–970506", MCNS Holdings, L.P., 1997, pp. ii to 103.

(List continued on next page.)

Primary Examiner—Dung C. Dinh
(74) Attorney, Agent, or Firm—McDonnell Boehnen Hulbert & Berghoff LLP

(57) ABSTRACT

A method and system for network address maintenance in a data-over-cable system. The method includes determining whether a network device, such as a cable modem, responds to a request in a timely manner. When updating network address tables, such as Address Resolution Protocol tables, an Internet Control Message Protocol ("ICMP") echo message is generated and sent to the Internet Protocol ("IP") address of a network device. If an ICMP echo reply message is not detected within a pre-determined time, the network address is deleted from the network address table. The deletion of the network address ensures that the device is isolated from the network. The method and system provide for the rapid removal of stale network addresses, freeing valuable memory space, and increasing security in a data-over-cable system.

24 Claims, 27 Drawing Sheets

U.S. PATENT DOCUMENTS

| | | | |
|---|---|---|---|
| 5,678,041 A | 10/1997 | Baker et al. | 395/609 |
| 5,708,654 A | 1/1998 | Arndt et al. | 370/242 |
| 5,710,885 A | 1/1998 | Bondi | |
| 5,724,510 A * | 3/1998 | Arndt et al. | 395/200.5 |
| 5,761,602 A | 6/1998 | Wagner et al. | |
| 5,778,181 A | 7/1998 | Hidary et al. | |
| 5,784,597 A | 7/1998 | Chiu et al. | 395/552 |
| 5,790,198 A | 8/1998 | Roop et al. | |
| 5,790,548 A | 8/1998 | Sistanizadeh et al. | |
| 5,790,677 A | 8/1998 | Fox et al. | |
| 5,790,770 A | 8/1998 | McClure et al. | 395/200.61 |
| 5,790,806 A | 8/1998 | Koperda | |
| 5,793,747 A | 8/1998 | Kline | 370/230 |
| 5,799,086 A | 8/1998 | Sudia | |
| 5,805,804 A | 9/1998 | Laursen et al. | |
| 5,809,252 A | 9/1998 | Beighe et al. | 395/200.57 |
| 5,812,819 A | 9/1998 | Rodwin et al. | |
| 5,815,664 A | 9/1998 | Asano | 395/200.57 |
| 5,818,845 A | 10/1998 | Moura et al. | |
| 5,819,028 A | 10/1998 | Manghirmalani et al. | 714/57 |
| 5,819,042 A | 10/1998 | Hansen | |
| 5,828,655 A | 10/1998 | Moura et al. | |
| 5,828,666 A | 10/1998 | Focsaneanu et al. | 370/389 |
| 5,835,720 A | 11/1998 | Nelson et al. | 709/224 |
| 5,835,727 A | 11/1998 | Wong et al. | |
| 5,841,777 A | 11/1998 | Cohen | |
| 5,848,233 A | 12/1998 | Radia et al. | 395/187.01 |
| 5,852,721 A | 12/1998 | Dillon et al. | |
| 5,854,901 A | 12/1998 | Cole et al. | |
| 5,859,852 A | 1/1999 | Moura et al. | |
| 5,864,679 A | 1/1999 | Kanai et al. | |
| 5,870,134 A | 2/1999 | Laubach et al. | |
| 5,872,523 A | 2/1999 | Dellaverson et al. | |
| 5,884,024 A | 3/1999 | Lim et al. | |
| 5,892,754 A | 4/1999 | Kompella et al. | 370/236 |
| 5,894,479 A | 4/1999 | Mohammed | 370/401 |
| 5,903,558 A | 5/1999 | Jones et al. | |
| 5,909,549 A * | 6/1999 | Compliment et al. | 709/223 |
| 5,913,037 A | 6/1999 | Spofford et al. | 709/226 |
| 5,915,119 A * | 6/1999 | Cone | 395/750.02 |
| 5,922,049 A | 7/1999 | Radia et al. | |
| 5,922,051 A | 7/1999 | Sidey | 709/223 |
| 5,923,659 A | 7/1999 | Curry et al. | |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | |
| 5,960,177 A | 9/1999 | Tanno | 395/200.59 |
| 5,974,453 A | 10/1999 | Andersen et al. | |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | |
| 6,009,103 A | 12/1999 | Woundy | |
| 6,012,088 A | 1/2000 | Li et al. | |
| 6,013,107 A | 1/2000 | Blackshear et al. | |
| 6,014,545 A | 1/2000 | Wu et al. | 455/3.1 |
| 6,018,767 A | 1/2000 | Fijolek et al. | |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | |
| 6,049,825 A * | 4/2000 | Yamamoto | 709/221 |
| 6,049,826 A | 4/2000 | Beser | |
| 6,052,724 A | 4/2000 | Willie et al. | 709/223 |
| 6,058,421 A | 5/2000 | Fijolek et al. | |
| 6,061,349 A | 5/2000 | Coile et al. | 370/389 |
| 6,064,372 A | 5/2000 | Kahkoska | 345/173 |
| 6,065,049 A | 5/2000 | Beser et al. | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | |
| 6,073,178 A | 6/2000 | Wong et al. | 709/229 |
| 6,075,787 A | 6/2000 | Bobeck et al. | |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A * | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A * | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar et al. | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan et al. | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hadrt et al. | 725/107 |

OTHER PUBLICATIONS

"Cable Modem to Customer Premise Equipment Interface Specification (Interim) SP–CMCI–I02–980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP–OS-SI–BPI–I01–980331", MCNS Holdings, L.P., 1997 and 1998, pp. ii to 33.

"Cable Modem Termination System–Network Side Interface Specification (Interim Specification) SP–CMTS–NSII01–960702", MCNS Holdings, L.P., 1996, pp. ii to 13.

"Removable Security Module Interface Specification (Interim Specification) SP–RSMI–I01–980204", MCNS Holdings, L.P., Cable Television Laboratories, Inc., 1997, pp. ii to 47.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., Cable Television Laboratories, Inc., 1997, pp. ii to 73.

"Internet Engineering Task Force", Request for Comments 2131, Dynamic Host Configuration Protocol (DHCP), Mar. 1997, pp. 1 to 42.

"Internet Engineering Task Force", IPCDN Working Group, IPCDN Telephony Return MIB, Mar. 1998, pp. 1 to 27.

Kyees et al., IEEE Electronic LIbrary, Citation and Abstract, IEEE Communications Magazine, vol. 33, Issue 4, Apr. 1995, "ADSL: A New Twisted–Pair Access To The Information Highway," pp. 52–60.

Yin–Hwa Huang et al., IEEE Electronic Library, Citation and Abstract, Acoustics, Speech, and Signal Processing, 1995.ICASSP–95., 1995 International Conference, vol. 4, May 9–12, 1995, "Design Of An MPEG–Based Set–Top Box For Video On Demand Services," pp. 2655–2658.

"A Solution For The Priority Queue Problem Of Deadline–Ordered Service Disciplines", N.R. Figueira, IEEE International Conference On Computer Communications And Networks, Sep. 22–25, 1997, pp. 320–325.

"Radio Frequency Interface Specification (Interim Specification) SP–RFI–I04–980724", MCNS Holdings, L.P., 1997, pp. ii to 196.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1–37.

Postel, J., *Internet Protocol, DARPA Internet Program Protocol Specification*, RFC 792, Sep. 1981, pp. 1–14.

Postel, J., *User Datagram Protocol*, RFC 768, Aug. 23, 1980, pp. 1–3.

RFC 793, *Transmission Control Protocol, DARPA Internet Program Protocol Specification*, Sep. 1981, pp. 1–68.

Case, J. et al., *A Simple Network Management Protocol (SNMP)*, RFC 1157, May 1990, pp. 1–26.

Sollins, K., *The TFTP Protocol (Revision 2)*, RFC 1350, Jul. 1992, pp. 1–9.

Alexander, S., *DHCP Options and BOOTP Vendor Extensions*, RFC 2132, Mar. 1997, pp. 1–37.

"Radio Frequency Interface Specification (Interim Specification) SP–RFIv1.1–I03–991105", MCNS Holdings, L.P., 1999, pp. Ii to 366.

"Radio Frequency Interface Specification (Interim Specification) SP–RFI–I05–991105", MCNS Holdings, L.P., 1999, pp. ii to 202.

"Radio Frequency Interface Specification (Interim Specification) SP–RFIv1.1–I06–001215", MCNS Holdings, L.P., 2000, pp. ii to 432.

* cited by examiner

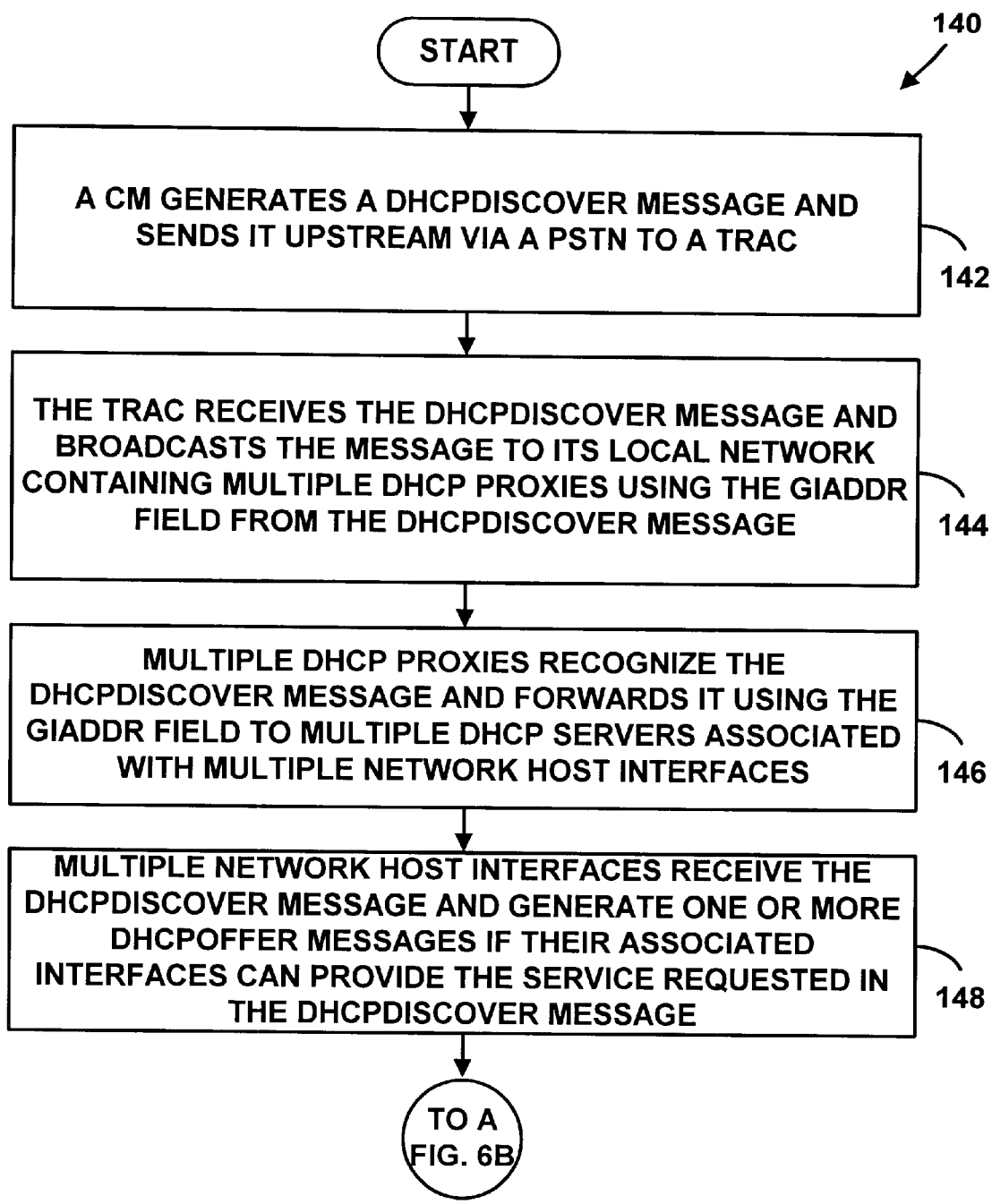

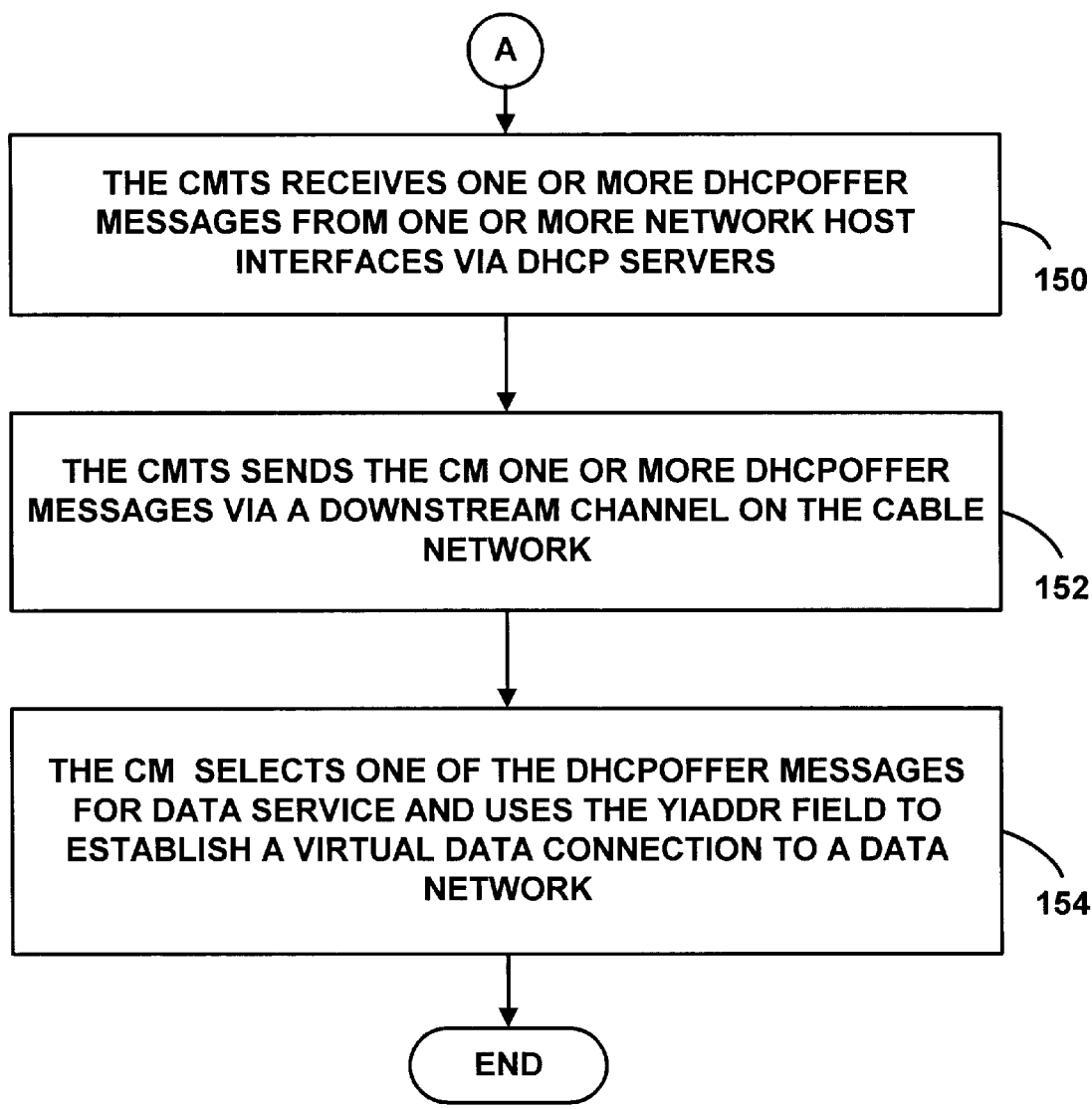

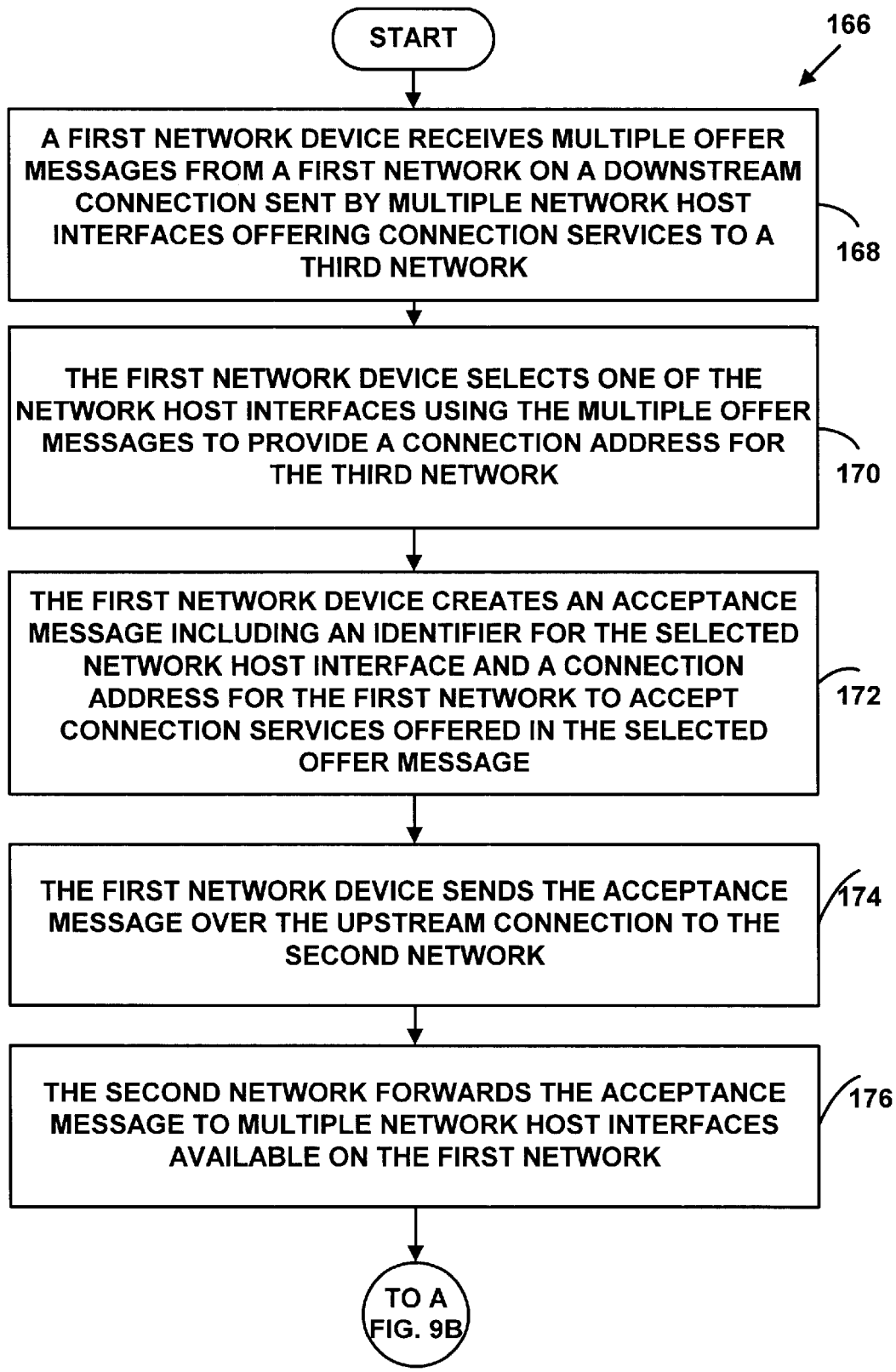

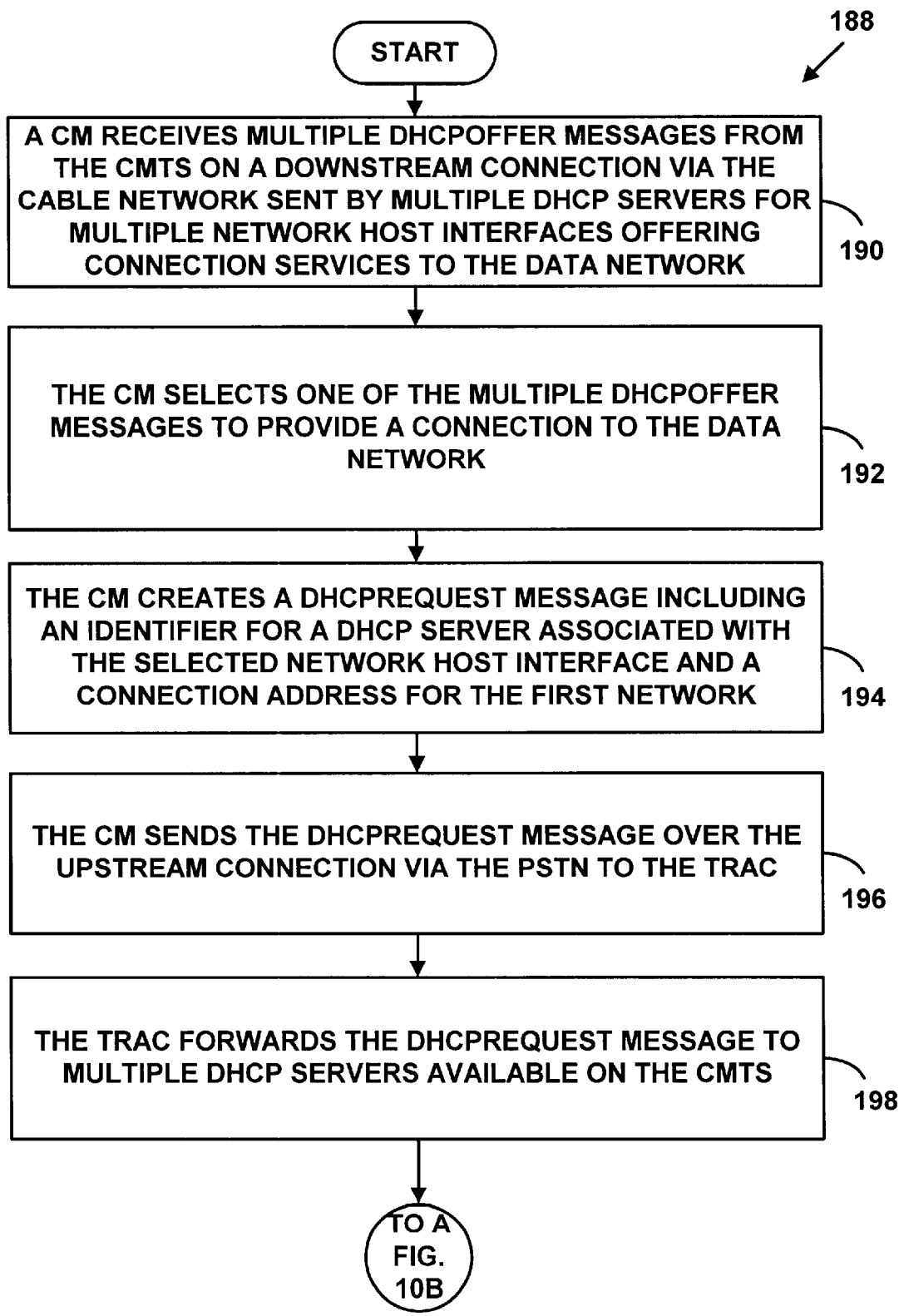

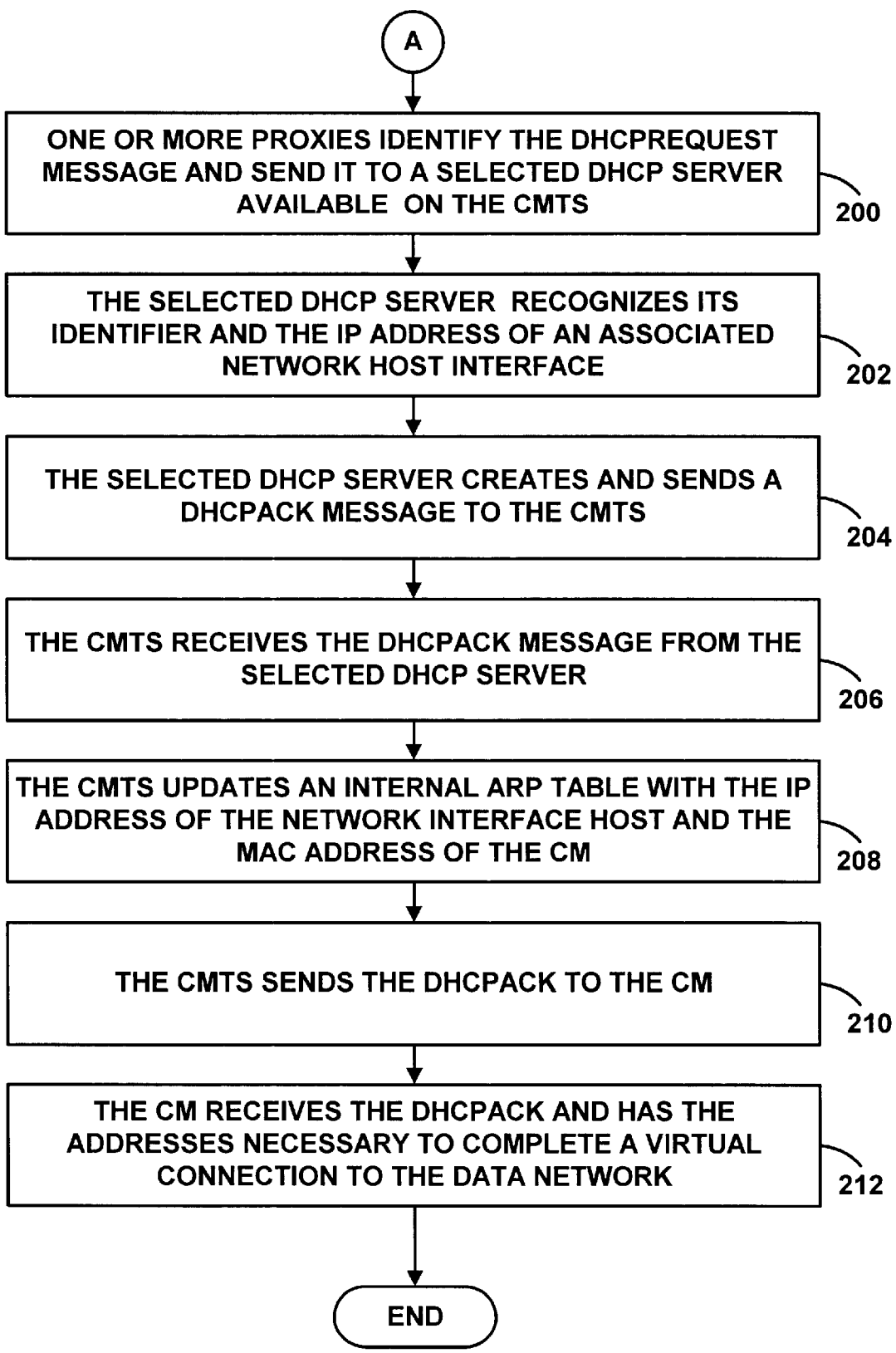

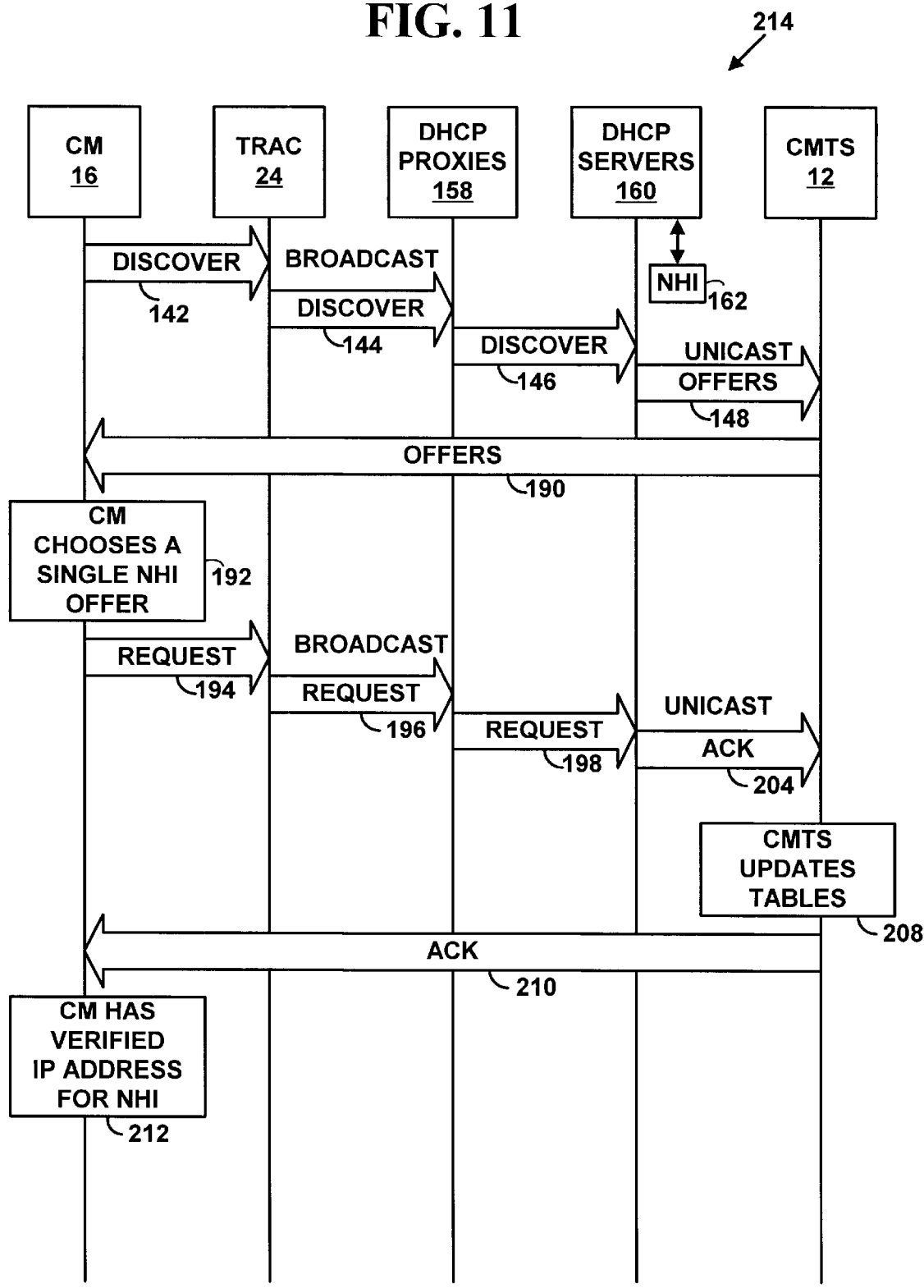

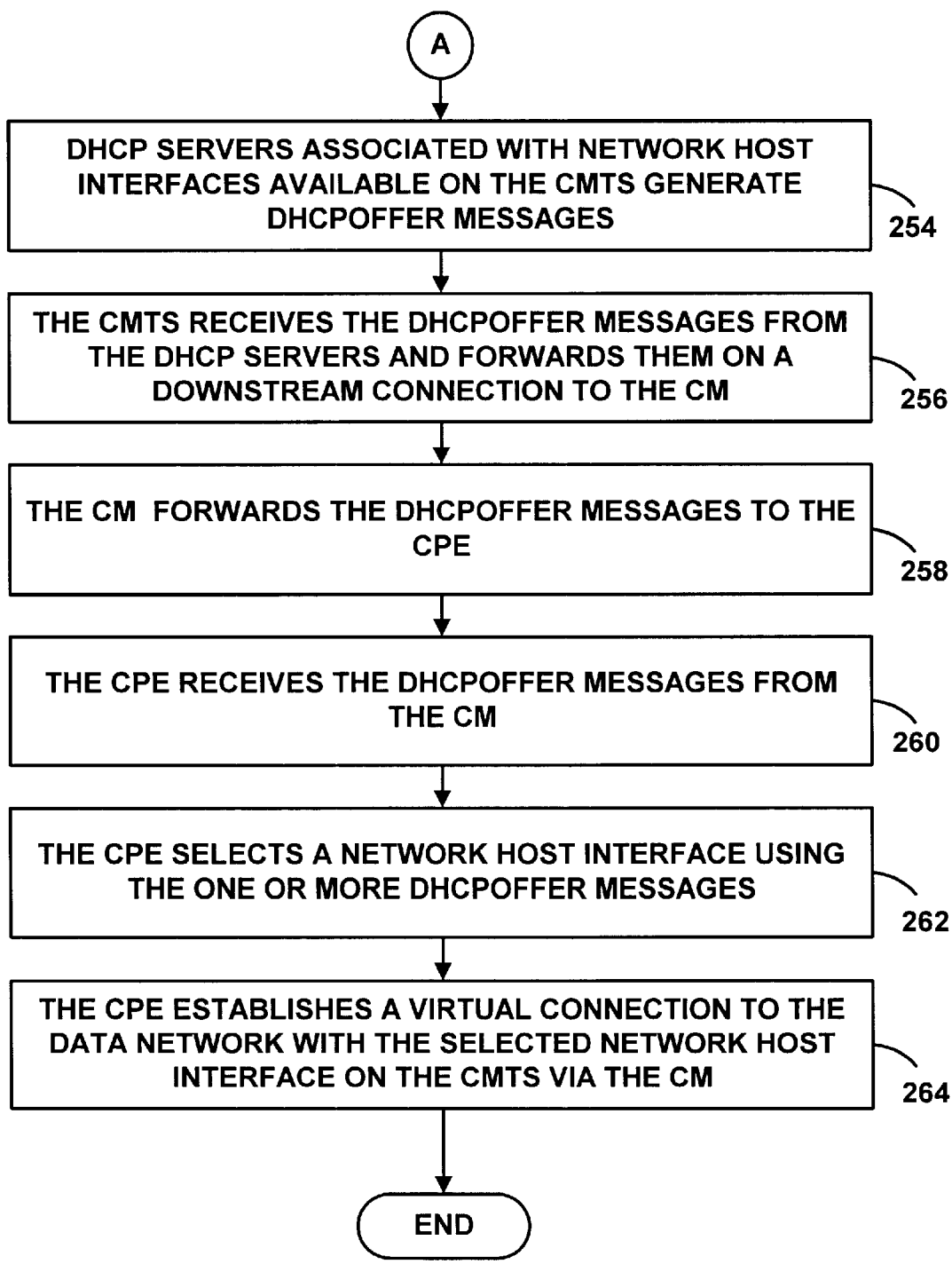

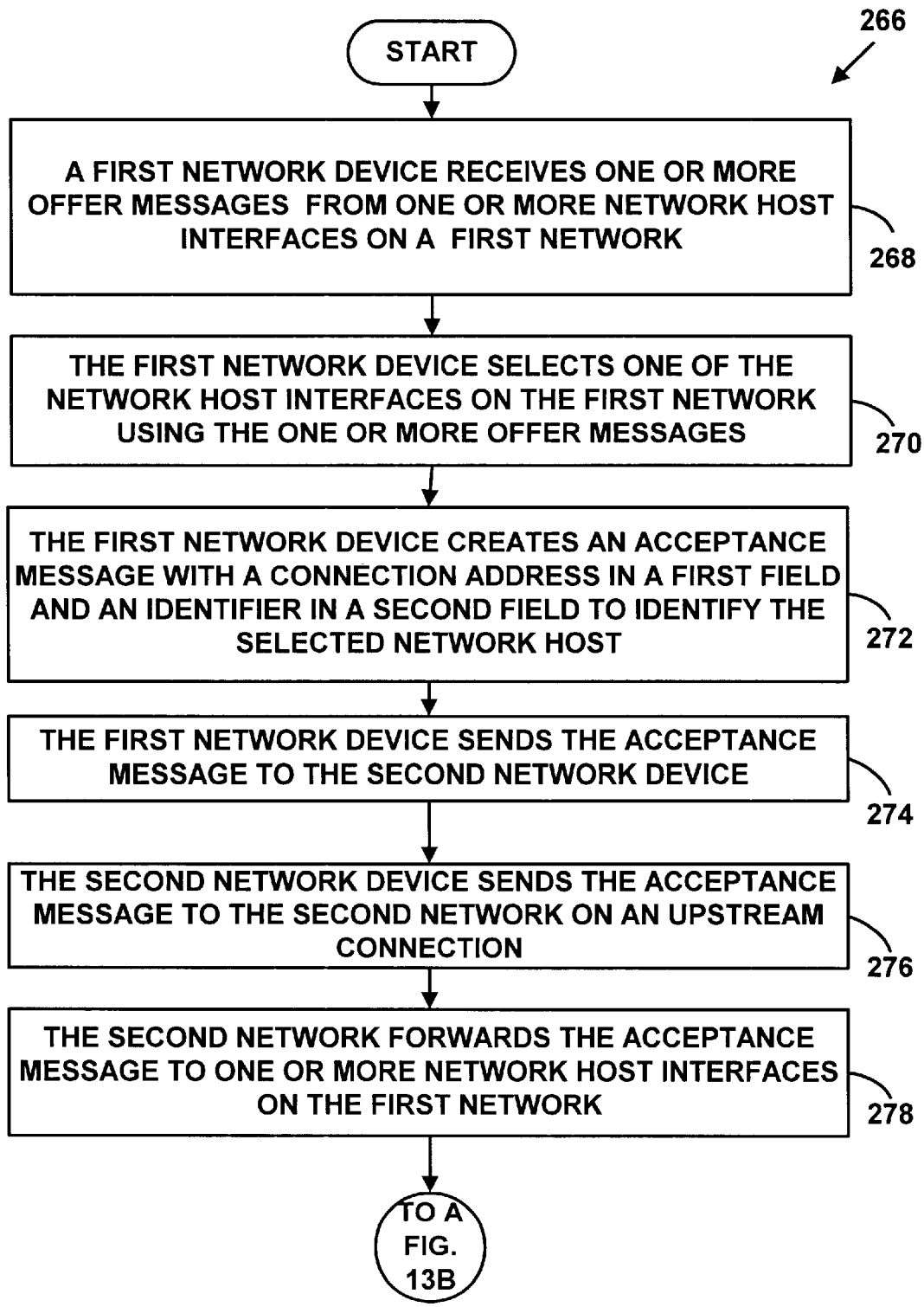

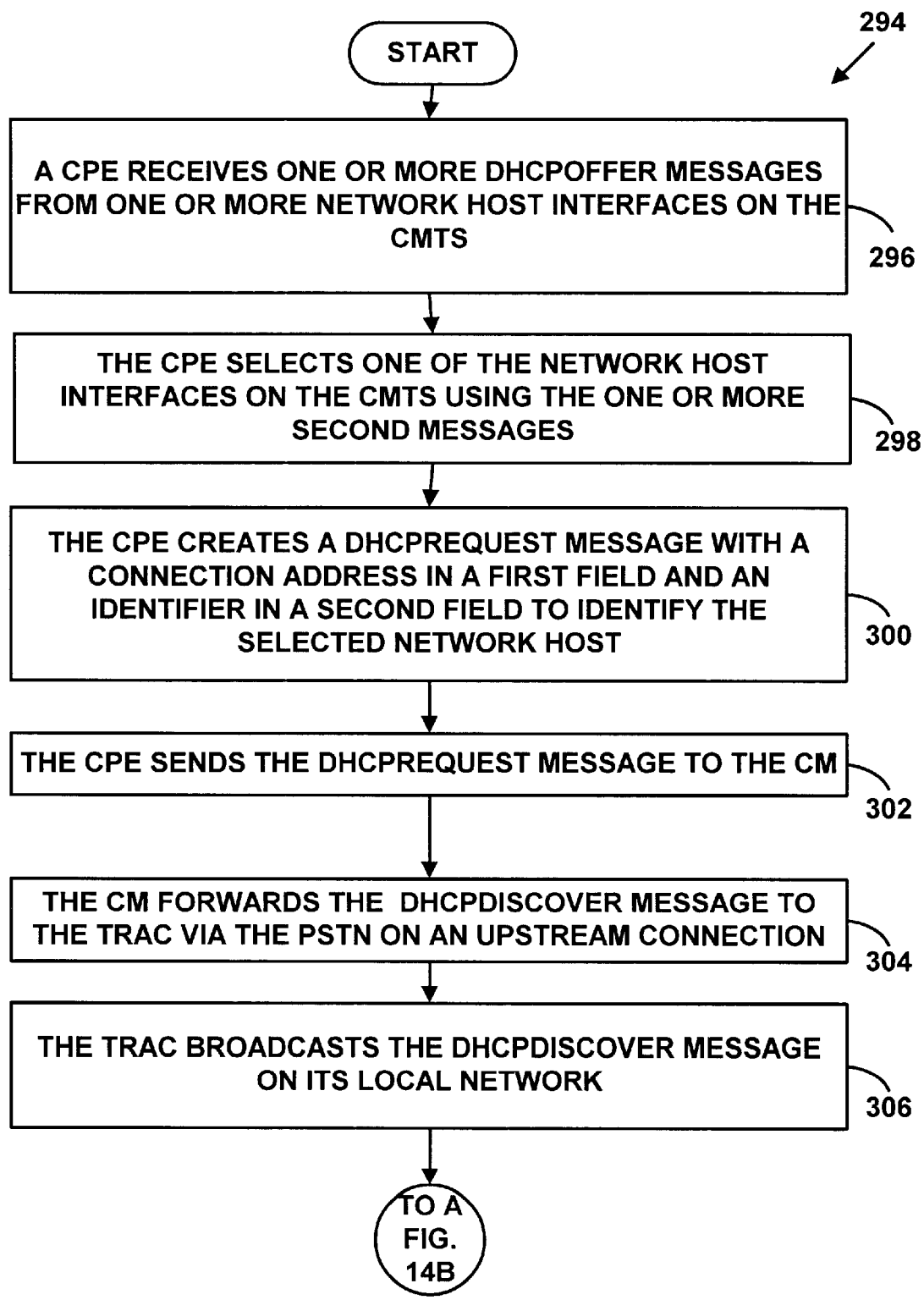

METHOD FOR NETWORK ADDRESS TABLE MAINTENANCE IN A DATA-OVER-CABLE SYSTEM USING DESTINATION REACHIBILITY

FIELD OF INVENTION

The present invention relates to communications in computer networks. More specifically, it relates to a method for network address maintenance in a data-over-cable system.

BACKGROUND OF THE INVENTION

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps which is a much larger data rate than can be supported by a modem used over a serial telephone line.

However, most cable television networks provide only uni-directional cable systems, supporting only a "downstream" data path. A downstream data path is the flow of data from a cable system "headend" to a customer. A cable system headend is a central location in the cable television network that is responsible for sending cable signals in the downstream direction. A return data path via a telephone network, such as a public switched telephone network provided by AT&T and others, (i.e., a "telephony return") is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator, and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

Both the cable modem termination system and cable modems maintain network address tables for identifying the destinations of data packets and providing information for directing the packets to the appropriate customer premise equipment. A network address table may be thought of as pairs of network addresses and forwarding addresses. Such tables are typically maintained by a protocol such as the Address Resolution Protocol. An incoming data packet at a cable modem or cable modem termination system is examined and its destination network address is determined. If a network address is present in the network address table, for the data packet, the data packet is forwarded to a corresponding forwarding address. The forwarding address may be another network address or it may be a physical address of a destination such as a Medium Access Control address.

Entries in these tables can often become stale through a failure to flush the tables upon termination of a connection. Termination could be the result of the conclusion of a session between the customer premise equipment and the network (e.g. a user logs off), or by the accidental or intentional power-down of any of the pieces of networking equipment. An Address Resolution Protocol stack does not delete stale entries immediately, but typically waits for an Address Resolution Protocol cache timeout period and then deletes stale entries. The cache timeout may be as long as ten minutes in some cases. Thus, stale entries can occupy valuable memory space in both the cable modems and the cable modem termination system for considerable lengths of time.

An entry may also become stale as a result of a security breach in the data-over-cable system or as a result of a failure of a cable modem or customer premise equipment to properly register with the data-over-cable system. In addition, a rogue user may breach security in a data-over-cable system by adopting addresses of a stale entry in an Address Resolution Protocol table before it is deleted by a cache timeout.

It is therefore desirable to improve the maintenance of the network address tables so that stale entries are quickly identified and removed from the table. Removal of stale entries may improve resource allocation and security in a data-over-cable system.

SUMMARY OF THE INVENTION

In accordance with preferred embodiments of the present invention, some of the problems associated with maintaining network address tables are overcome. A method and system for network address table maintenance in a data-over-cable system is provided. One aspect of the invention includes a method for network address table maintenance. The method includes reading a first network protocol address, for a protocol other than a data link layer protocol, from a network address table associated with a first network device.

A first request message is sent from the first network device to a second network device associated with the first network protocol address to determine if the second network device is active. A determination is made as to whether the first network device receives a second reply message from the second network device within a predetermined amount of time, and if not, the first network protocol address is deleted from the network address table.

For example, the method and system of the present invention may provide for the maintenance of a network address table such as an Address Resolution Protocol table. An Internet Protocol address is read from a network address table associated with a first network device such as a cable modem termination system. The first network device transmits an Internet Control Message Protocol echo message to determine whether there is an active second network device, such as a cable modem, associated with this Internet Protocol address. Should there be no echo reply message within a pre-determined time, the first network device deletes the entry or entries corresponding to the read address from the network address table. This may help ensure that the device ceases communication with the network and may increase the security of the network. However, the present invention is not limited to cable modems, cable modem termination systems, or Address Resolution Protocol tables, and other network devices and address tables could be used.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIGS. 6A and 6B are a flow diagram illustrating a method for discovering hosts in a cable modem system;

FIGS. 9A and 9B are a flow diagram illustrating a method for resolving host addresses in a data-over-cable system;

FIGS. 10A and 10B are a flow diagram illustrating a method for resolving discovered host addresses; and FIG. 11 is a block diagram illustrating the message flow of the method illustrated in FIGS. 10A and 10B;

FIGS. 12A and 12B are a flow diagram illustrating a method for addressing network host interfaces from customer premise equipment;

FIGS. 13A and 13B are a flow diagram illustrating a method for resolving addresses for customer premise equipment;

FIGS. 14A and 14B are a flow diagram illustrating a method for resolving network host interfaces from customer premise equipment;

DETAILED DESCRIPTION OF PREFERRED EMBODIMENTS

Cable Modem System with Telephony Return

Figure 1:
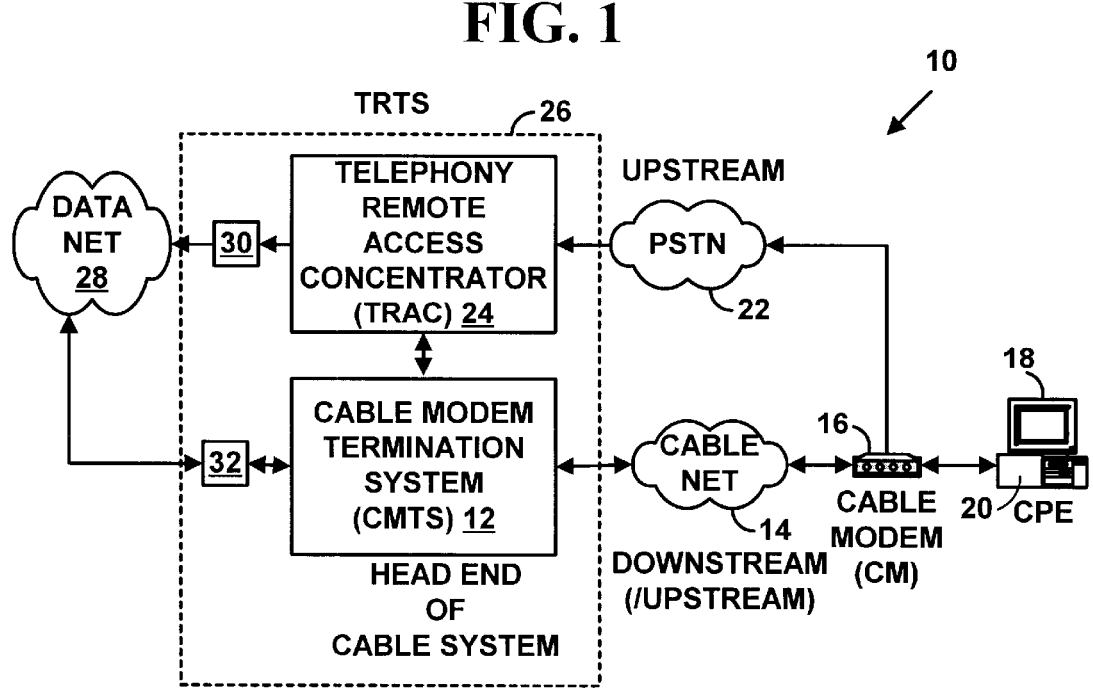
FIG. 1 is a block diagram illustrating a cable modem system with telephony return.

FIG. 1 is a block diagram illustrating an exemplary data-over-cable system with telephony return 10, hereinafter data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1 and the present invention is not limited to a data-over-cable system with telephony return. In a data-over cable system without telephony return, customer premise equipment or cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. The cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection.

The CM 16 is connected to Customer Premise Equipment ("CPE") 18 such as a personal computer system via a Cable Modem-to-CPE Interface ("CMCI") 20. The CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24. In a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via the cable network 14 is illustrated in FIG. 1.

FIG. 1 illustrates a telephony modem integral to the CM 16. In another embodiment of the present invention, the telephony modem is a separate modem unit external to a CM 16 used specifically for connecting with a PSTN 22. A separate telephony modem includes a connection to the CM 16 for exchanging data. The CM 16 includes cable modems provided by the 3Com Corporation of Santa Clara, Calif., and others. In yet another embodiment of the present invention, a CM 16 includes functionality to connect only to a cable network 14 and receives downstream signals from the cable network 14 and sends upstream signals to the cable network 14 without telephony return. The present invention is not limited to cable modems used with telephony return.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of a cable network 14, and the TRAC 24 may be located in a different geographic location from the CMTS 12. Content severs, operations servers, administrative servers and maintenance servers used in data-over-cable system 10 (not shown in FIG. 1) may also be in different locations. Access points to the data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet or an intranet) by a TRAC-Network System Interface 30 ("TRAC-NSI"). The CMTS 12 is connected to data network 28 by a CMTS-Network System Interface ("CMTS-NSI") 32. The present invention is not limited to the data-over-cable system 10 illustrated in FIG. 1, and more or fewer components, connections and interfaces could also be used.

Cable Modem Protocol Stack

Figure 2:
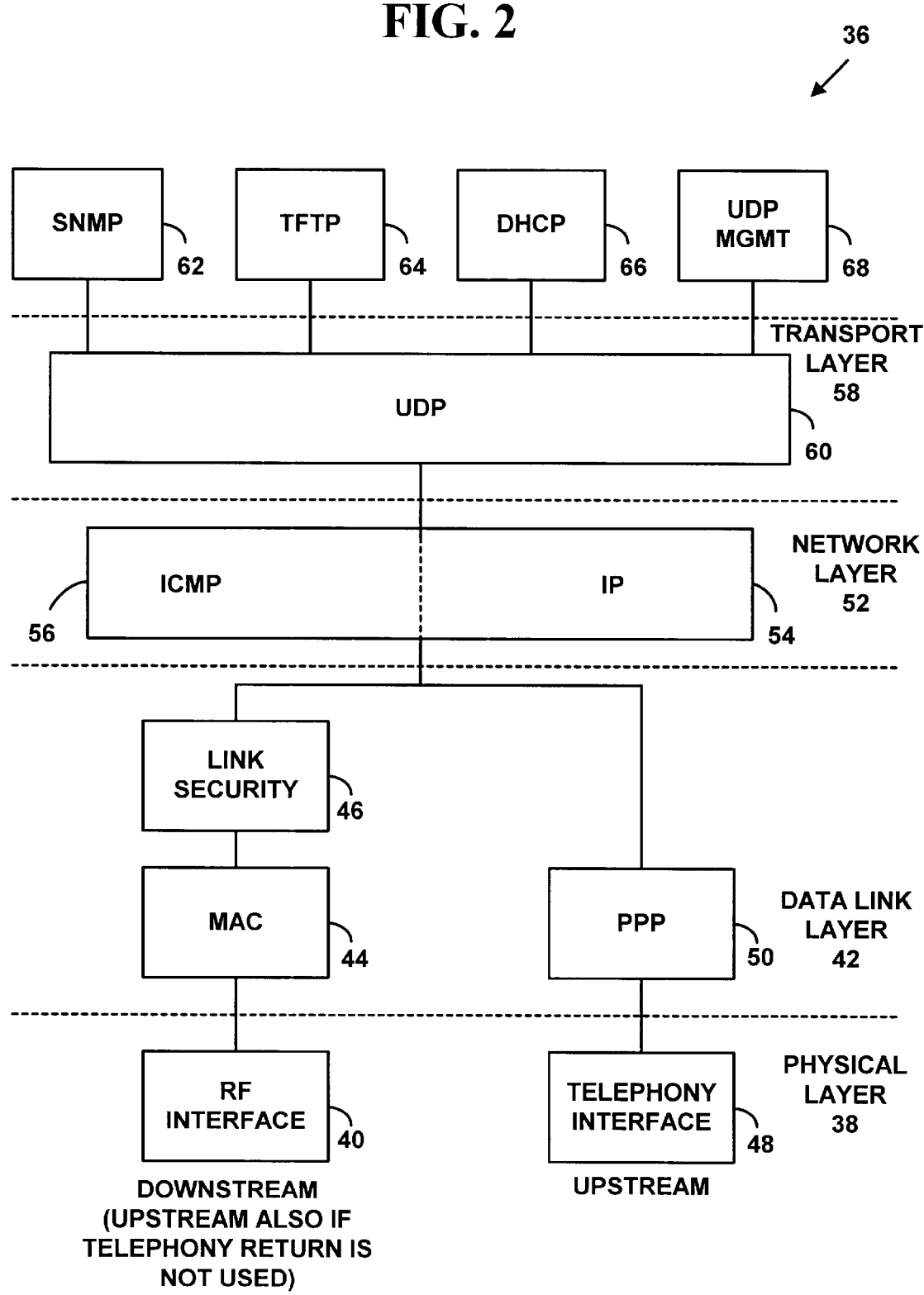
FIG. 2 is a block diagram illustrating a protocol stack for a cable modem.

FIG. 2 is a block diagram illustrating a protocol stack 36 for the CM 16. FIG. 2 illustrates the downstream and upstream protocols used in the CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, the CM 16 is connected to the cable network 14 in a physical layer 38 via a Radio Frequency ("RF") Interface 40. In an exemplary preferred embodiment of the present invention, the RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies modulation methods could also be used. For more information on the RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above the RF interface 40 in a data-link layer 42 is a Medium Access Control ("MAC") layer 44. As is known in the art, the MAC layer 44 controls access to a transmission medium via the physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The Link security protocol stack 46 prevents authorized users from making a data connection from cable network 14. The RF interface 40 and the MAC layer 44 can also be used for an upstream connection if the data-over-cable system 10 is used without telephony return.

For upstream data transmission with telephony return, the CM 16 is connected to the PSTN 22 in the physical layer 38 via telephony interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as telephony interface 48. As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used.

Above the telephony interface 48 in the data link layer 42 is a Point-to-Point Protocol ("PPP") layer 50, hereinafter PPP 50. As is known in the art, the PPP is used to encapsulate network layer datagrams over a serial communications link. For more information on the PPP see Internet Engineering Task Force ("IETF") Request for Comments ("RFC"), RFC-1661, RFC-1662 and RFC-1663 incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. The IP layer 54, hereinafter IP 54, roughly corresponds to OSI layer 3, the network layer, but is typically not defined as part of the OSI model. As is known in the art, the IP 54 is a routing protocol designed to route traffic within a network or between networks. For more information on the IP 54 see RFC-791 incorporated herein by reference.

The Internet Control Message Protocol ("ICMP") layer 56 is used for network management. The main functions of the ICMP layer 56, hereinafter ICMP 56, include error reporting, reachability testing (e.g., "pinging") congestion control, route-change notification, performance, subnet addressing and others. Since the IP 54 is an unacknowledged protocol, datagrams may be discarded and the ICMP 56 is used for error reporting. For more information on the ICMP 56 see RFC-792 incorporated herein by reference.

Above the IP 54 and the ICMP 56 is a transport layer 58 with a User Datagram Protocol layer 60 ("UDP"). The UDP layer 60, hereinafter UDP 60, roughly corresponds to OSI layer 4, the transport layer, but is typically not defined as part of the OSI model. As is known in the art, the UDP 60 provides a connectionless mode of communications with datagrams. For more information on the UDP 60 see RFC-768 incorporated herein by reference.

Above the network layer are a Simple Network Management Protocol ("SNMP") layer 62, a Trivial File Protocol ("TFTP") layer 64, a Dynamic Host Configuration Protocol ("DHCP") layer 66 and a UDP manager 68. The SNMP layer 62 is used to support network management functions. For more information on the SNMP layer 62 see RFC-1157 incorporated herein by reference. The TFTP layer 64 is a file transfer protocol used to download files and configuration information. For more information on the TFTP layer 64 see RFC-1350 incorporated herein by reference. The DHCP layer 66 is a protocol for passing configuration information to hosts on an IP 54 network. For more information on the DHCP layer 66 see RFC-1541 incorporated herein by reference. The UDP manager 68 distinguishes and routes packets to an appropriate service (e.g., a virtual tunnel). More or few protocol layers could also be used with a data-over-cable system 10.

The CM 16 supports transmission and reception of IP 54 datagrams as specified by RFC-791. The CMTS 12 and the TRAC 24 may perform filtering of the IP 54 datagrams. The CM 16 is configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards the IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and the CMTS 12 which preclude filtering, or various forms of virtual tunneling and reverse virtual tunneling could be used to virtually source upstream packets from the CM 16. For more information on virtual tunneling see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

The CM 16 also forwards the IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is the IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or PSTN 22 if so configured. The CM 16 is configurable for IP 54 broadcast datagram filtering.

An operating environment for the CM 16 and other network devices of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical signals represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem with Telephony Return

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used.

Figure 3:
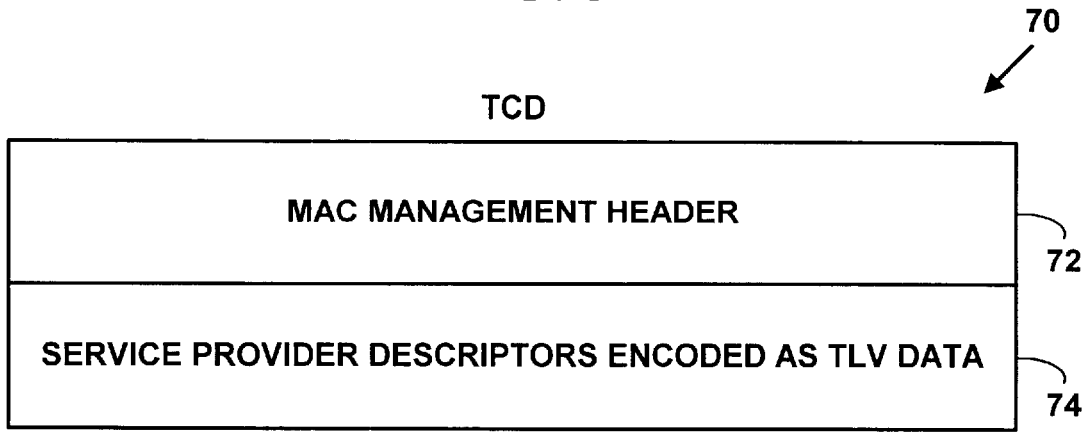
FIG. 3 is a block diagram illustrating a Telephony Channel Descriptor message structure.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by a CM 16 to initiate a telephone call. The SPD 74 is a TLV-encoded data structure that contains sets of dialing and access parameters for a CM 16 with telephony return. The SPD 74 is contained within the TCD message 70. There may be multiple SPD 74 encodings within a single TCD message 70. There is at least one SPD 74 in TCD message 70. SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE(1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will use an authentication protocol over the telephone link during the initialization procedure. Format is a monolithic sequence of alphanumeric characters in an ASCII string composed of numbers and letters. |
| Login Password | This contains a password that the CM 16 will use during authentication over a telephone link during the initialization procedure. Format is a monolithic sequence of alphanumeric characters in an ASCII string composed of numbers and letters. |
| DHCP Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP Server | The IP 54 address value of a DHCP 66 Server the CM 16 uses for the DHCP 66 Client and BOOTP Relay Process. If this attribute is present and the DHCP 66 Authenticate attribute is TRUE(1). The default value is integer zero. |
| RADIUS Realm | The realm name is a string that defines a RADIUS server domain. Format is a monolithic sequence of alphanumeric characters in an ACSII string composed of numbers and letters. |
| PPP Authentication | This parameter instructs the telephone modem which authentication procedure to perform over the telephone link. |

TABLE 1-continued

| SPD 74 Parameter | Description |
| --- | --- |
| Demand Dial Timer | This parameter indicates time (in seconds) of inactive networking time that will be allowed to elapse before hanging up a telephone connection at the CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report CMTS 12 information to a CM 16 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of TRI_TSI.

Figure 4:
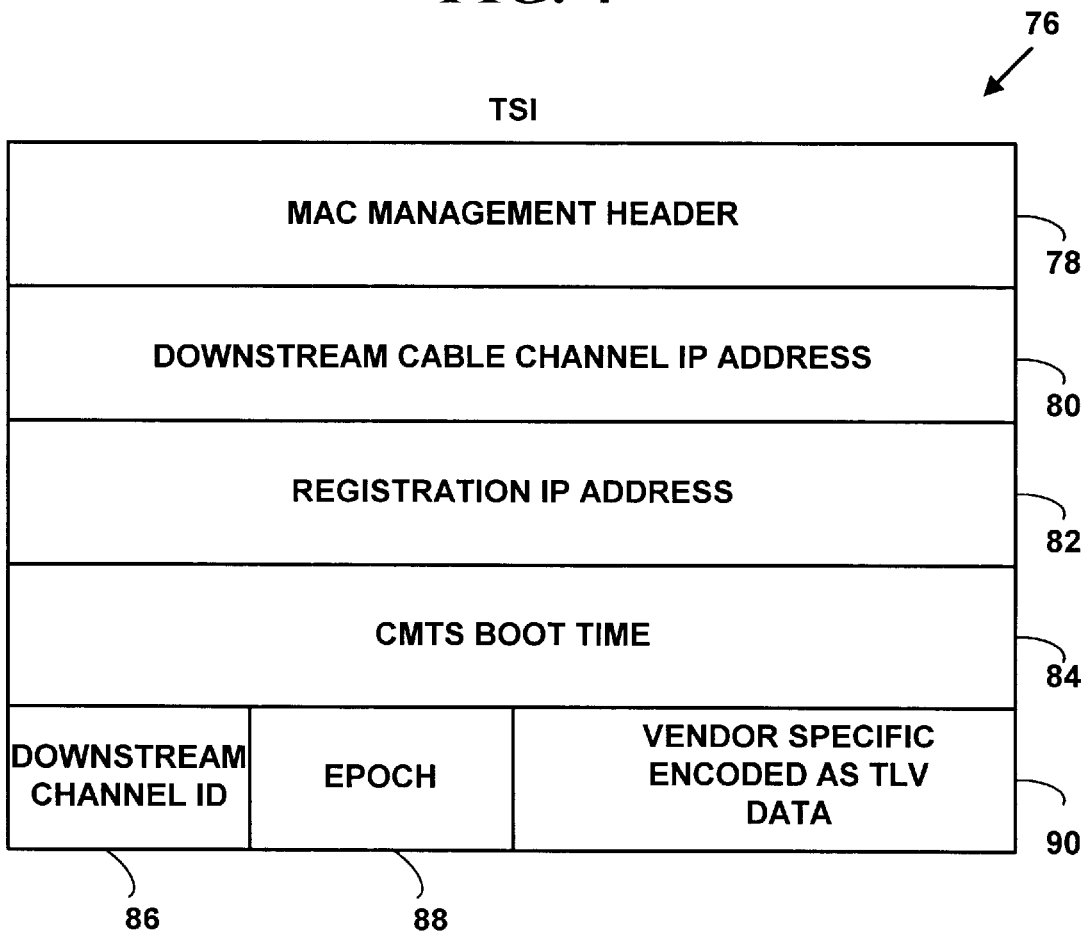
FIG. 4 is a block diagram illustrating a Termination System Information message structure.

FIG. 4 is a block diagram of a TSI message structure 76. The TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of the TSI message 76 are shown in Table 2. However, more or fewer fields could also be used in the TSI message 76.

TABLE 2

| TSI 76 Parameter | Description |
| --- | --- |
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by the CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

After receiving the TCD 70 message and the TSI message 76, the CM 16 continues to establish access to the data network 28 (and resources on the network) by first dialing into the TRAC 24 and establishing a telephony PPP 50 session. Upon the completion of a successful PPP 50 connection, the CM 16 performs PPP Link Control Protocol ("LCP") negotiation with the TRAC 24. Once LCP negotiation is complete, the CM 16 requests Internet Protocol Control Protocol ("IPCP") address negotiation. For more information on IPCP see RFC-1332 incorporated herein by reference. During the IPCP negotiation, the CM 16 negotiates an IP 54 address with the TRAC 24 for sending IP 54 data packet responses back to the data network 28 via the TRAC 24.

When the CM 16 has established an IP 54 link to the TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from the data network 28 via the CMTS 12 and the cable network 14, and send return data to the data network 28 via the TRAC 24 and the PSTN 22. The CM 16 determines an IP 54 network host interface address available on the CMTS 12 to receive IP 54 data packets from the data network 28, thereby establishing a virtual IP 54 connection with the data network 28. However, the present invention is not limited to the network components, addresses, or virtual data connections described.

An exemplary data path through a cable system 10 is illustrated in Table 3. However other data paths could also be used and the present invention is not limited to the data paths shown in Table 3. For example, the CM 16 may send data upstream back through the cable network 14 (e.g., the CM 16 to the cable network 14 to the CMTS 12) and not use the PSTN 22 and the telephony return upstream path.

TABLE 3

1. An IP 54 datagram from the data network 28 destined for the CM 16 arrives on the CMTS-NSI 32 and enters the CMTS 12.
2. The CMTS 12 encodes the IP 54 datagram in a cable data frame, passes it to the MAC 44 and transmits it "downstream" to the RF interface 40 on the CM 16 via the cable network 14.
3. The CM 16 recognizes the encoded IP 54 datagram in the MAC layer 44 received via the RF interface 40.
4. The CM 16 responds to the cable data frame and encapsulates a response IP 54 datagram in a PPP 50 frame and transmits it "upstream" with the modem interface 48 via the PSTN 22 to the TRAC 24.
5. The TRAC 24 decodes the IP 54 datagram and forwards it via the TRAC-NSI 30 to a destination on the data network 28.

Dynamic Network Host Configuration on a Data-over-cable System

As was illustrated in FIG. 2, the CM 16 includes a Dynamic Host Configuration Protocol ("DHCP") layer 66, hereinafter DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. The DHCP 66 is built on a client-server model, where designated DHCP 66 servers allocate network host addresses and deliver configuration parameters to dynamically configured network host clients.

Figure 5:
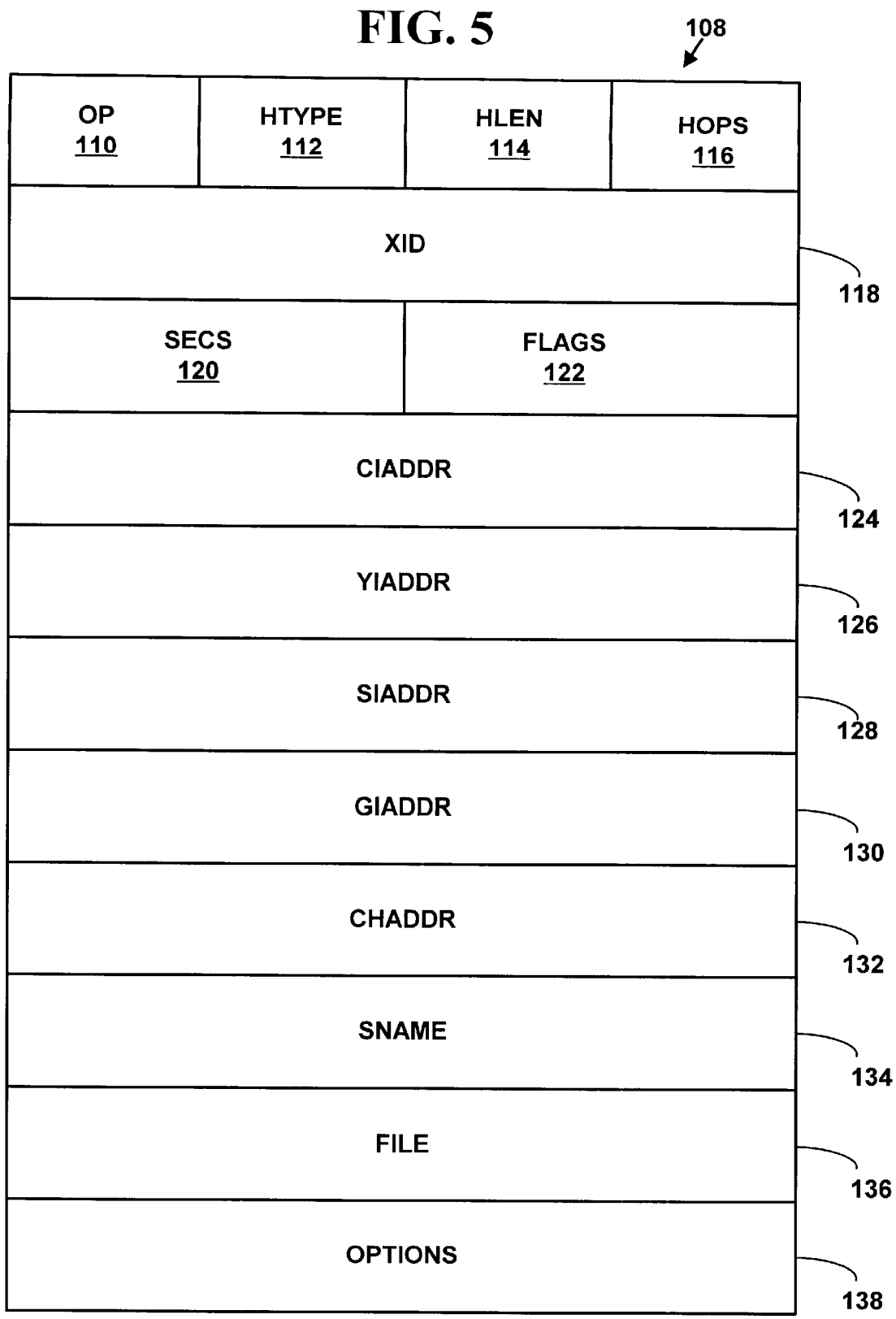
FIG. 5 is a block diagram illustrating a Dynamic Host Configuration Protocol message structure.

FIG. 5 is a block diagram illustrating a DHCP 66 message structure 108. The format of DHCP 66 messages is based on the format of BOOTstrap Protocol ("BOOTP") messages described in RFC-951 and RFC-1542 incorporated herein by reference. From a network host client's point of view, DHCP 66 is an extension of the BOOTP mechanism. This behavior allows existing BOOTP clients to interoperate with DHCP 66 servers without requiring any change to network host the clients' BOOTP initialization software. The DHCP 66 provides persistent storage of network parameters for network host clients.

To capture BOOTP relay agent behavior described as part of the BOOTP specification and to allow interoperability of existing BOOTP clients with DHCP 66 servers, the DHCP 66 uses a BOOTP message format. Using BOOTP relaying agents eliminates the necessity of having a DHCP 66 server on each physical network segment.

The DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for DHCP 66 message 108 fields are shown in Table 4.

TABLE 4

| DHCP 66 Parameter | Description |
| --- | --- |
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to a large number, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; fitted in by client in DHCPREQUEST if verifying previously allocated configuration parameters. |
| YIADDR 126 | 'Your' (client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 5 is used to discover IP 54 and other network host interfaces in data-over-cable system 10. A network host client (e.g., CM 16) uses DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.

TABLE 5-continued

2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering Network Host Interfaces in the Data-over-cable System

The DHCP discovery process illustrated in table 5 will not work in data-over-cable system 10. A CM 16 has only a downstream connection from a CMTS 12, which includes DHCP 66 servers, associated with network host interfaces available on the CMTS 12. In an illustrative embodiment of the present invention, a CM 16 discovers network host interfaces via a TRAC 24 and a PSTN 22 on an upstream connection.

The DHCP 66 addressing process shown in Table 5 was not originally intended to discover network host interfaces in data-over-cable system 10. The CMTS 12 has DHCP 66 servers associated with network host interfaces (e.g., IP interfaces), but the CM 16 only has as downstream connection from the CMTS 12. The CM 16 has an upstream connection to the TRAC 24, which has a DHCP 66 layer. However, the TRAC 24 does not have DHCP 66 servers, or direct access to network host interfaces on the CMTS 12.

FIGS. 6A and 6B are a flow diagram illustrating a Method 140 for discovering network host interfaces in data-over-cable system 10. When the CM 16 has established an IP 54 link to the TRAC 24, it begins communications with the CMTS 12 via DHCP 66 to complete a virtual IP 54 connection with the data network 28. However, to discover what IP 54 host interfaces might be available on the CMTS 12, the CM 16 has to communicate with the CMTS 12 via the PSTN 22 and the TRAC 24 since the CM 16 only has a "downstream" cable channel from the CMTS 12.

At Step 142 in FIG. 6A, after receiving a TSI message 76 from the CMTS 12 on a downstream connection, the CM 16 generates a DHCP discover ("DHCPDISCOVER") message and sends it upstream via the PSTN 22 to the TRAC 22 to discover what IP 54 interfaces are available on the CMTS 12. The fields of the DHCP discover message are set as illustrated in Table 6. However, other field settings may also be used.

TABLE 6

| DHCP 66 Parameter | Description |
|---|---|
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet). |
| HOPS 116 | Set to a large number. |
| FLAGS 118 | Set BROADCAST bit to zero. |
| CIADDR 124 | If the CM 16 has previously been assigned an IP 54 address, the IP 54 address is placed in this field. If the CM 16 has previously been assigned an IP 54 address by DHCP 66, and also has been assigned an address via IPCP, the CM 16 places the DHCP 66 IP 54 address in this field. |
| GIADDR 130 | The CM 16 places the Downstream Channel IP 54 address 80 of the CMTS 12 obtained in TSI message 76 on a cable downstream channel in this field. |
| CHADDR 132 | The CM 16 places its 48-bit MAC 44 LAN address in this field. |

The DHCPDISCOVER message is used to "discover" the existence of one or more IP 54 host interfaces available on the CMTS 12. The DHCP 66 giaddr-field 130 (FIG. 5) includes the downstream channel IP address 80 of the CMTS 12 obtained in the TSI message 76. Using the downstream channel IP address 80 of the CMTS 12 obtained in the TSI message 76 allows the DHCPDISCOVER message to be forwarded by the TRAC 24 to the DHCP 66 servers (i.e., protocol servers) associated with network host interfaces available on the CMTS 12. If the DHCP 66 giaddr-field 130 (FIG. 5) in a DHCP message from a DHCP 66 client is non-zero, the DHCP 66 server sends any return messages to a DHCP 66 server port on a DHCP 66 relaying agent (e.g., CMTS 12) whose address appears in the DHCP 66 giaddr-field 130.

In a typical DHCP 66 discovery process the DHCP 66 giaddr-field 130 is set to zero. If the DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124 (FIG. 5), or to a client's hardware address specified in the DHCP 66 chaddr-field 132 (FIG. 5) or to a local subnet broadcast address (e.g., 255.255.255.255).

At Step 144, a DHCP 66 layer on the TRAC 24 broadcasts the DHCPDISCOVER message on its local network leaving the DHCP 66 giaddr-field 130 intact since it already contains a non-zero value. The TRAC's 24 local network includes connections to one or more DHCP 66 proxies (i.e., network host interface proxies). The DHCP 66 proxies accept the DHCP 66 messages originally from the CM 16 destined for the DHCP 66 servers connected to network host interfaces available on the CMTS 12 since the TRAC 24 has no direct access to the DHCP 66 servers associated with network host interfaces available on the CMTS 12. DHCP 66 proxies are not used in a typical DHCP 66 discovery process.

One or more DHCP 66 proxies on the TRAC's 24 local network recognizes the DHCPDISCOVER message and forwards it to one or more DHCP 66 servers associated with network host interfaces (e.g., IP 54 interfaces) available on the CMTS 12 at Step 146. Since the DHCP 66 giaddr-field 130 (FIG. 5) in the DHCPDISCOVER message sent by the CM 16 is already non-zero (i.e., contains the downstream IP address of CMTS 12), the DHCP 66 proxies also leave the DHCP 66 giaddr-field 130 intact.

One or more DHCP 66 servers for network host interfaces (e.g., IP 54 interfaces) available on the CMTS 12 receive the DHCPDISCOVER message and generate a DHCP 66 offer message ("DHCPOFFER") at Step 148. The DHCP 66 offer message is an offer of configuration parameters sent from network host interfaces to the DHCP 66 servers and back to a network host client (e.g., CM 16) in response to a DHCPDISCOVER message. The DHCP 66 offer message is sent with the message fields set as illustrated in Table 7. However, other field settings can also be used. The DHCP 66 yiaddr-field 126 contains an IP 54 address for a network host interface available on the CMTS 12 and used for receiving data packets from data network 28.

TABLE 7

| DHCP 66 Parameter | Description |
| --- | --- |
| FLAGS 122 | BROADCAST bit set to zero. |
| YIADDR 126 | An IP 54 address from a network host interface to allow the CM 16 to receive data from data network 28 via a network host interface available on the CMTS 12. |
| SIADDR 128 | An IP 54 address for a TFTP 64 server to download configuration information for an interface host. |
| CHADDR 132 | The MAC 44 address of the CM 16. |
| SNAME 134 | Optional DHCP 66 server identifier with an interface host. |
| FILE 136 | A TFTP 64 configuration file name for the CM 16. |

The DHCP 66 servers send the DHCPOFFER message to the address specified in the giaddr-field 130 (i.e., CMTS 12) from the DHCPDISCOVER message if associated network host interfaces (e.g., IP 54 interfaces) can offer the requested service (e.g., IP 54 service) to the CM 16. The DHCPDISOVER message DHCP 66 giaddr-field 130 contains a downstream channel IP address 80 of the CMTS 12 that was received by the CM 16 in the TSI message 76. This allows the CMTS 12 to receive the DHCPOFFER messages from the the DHCP 66 servers and send them to the CM 16 via a downstream channel on cable network 14.

At Step 150 in FIG. 6B, the CMTS 12 receives one or more DHCPOFFER messages from one or more DHCP 66 servers associated with the network host interfaces (e.g., IP 54 interfaces). The CMTS 12 examines the DHCP 66 yiaddr-field 126 and the DHCP 66 chaddr-field 132 in the DHCPOFFER messages and sends the DHCPOFFER messages to the CM 16 via the cable the network 14. The DHCP 66 yiaddr-field 126 contains an IP 54 address for a network host IP 54 interface available on the CMTS 12 and used for receiving IP 54 data packets from the data network 28. The DHCP 66 chaddr-field 132 contains the MAC 44 layer address for the CM 16 on a downstream cable channel from the CMTS 12 via the cable network 14. The CMTS 12 knows the location of the CM 16 since it sent the CM 16 a MAC 44 layer address in one or more initialization messages (e.g., TSI message 76).

If a BROADCAST bit in flags field 124 is set to one, the CMTS 12 sends the DHCPOFFER messages to a broadcast IP 54 address (e.g., 255.255.255.255) instead of the address specified in the DHCP 66 yiaddr-field 126. The DHCP 66 chaddr-field 132 is still used to determine that MAC 44 layer address. If the BROADCAST bit in the DHCP 66 flags field 122 is set, the CMTS 12 does not update internal address or routing tables based upon the DHCP 66 yiaddr-field 126 and the DHCP 66 chaddr-field 132 pair when a broadcast message is sent.

At Step 152, the CM 16 receives one or more DHCPOFFER messages from the CMTS 12 via the cable network 14 on a downstream connection. At Step 154, the CM 16 selects an offer for an IP 54 service from one of the network host interfaces (e.g., an IP interfaces 54) available on the CMTS 12 that responded to the DHCPDISCOVER message sent at Step 142 in FIG. 6A and establishes a virtual IP 54 connection. The selected DHCPOFFER message contains a network host interface address (e.g., IP 54 address) in the DHCP 66 yiaddr-field 126 (FIG. 5). A cable modem acknowledges the selected network host interface with the DHCP 66 message sequence explained below.

After selecting and acknowledging a network host interface, the CM 16 has discovered an IP 54 interface address available on the CMTS 12 for completing a virtual IP 54 connection with the data network 28. Acknowledging a network host interface is explained below. The virtual IP 54 connection allows IP 54 data from the data network 28 to be sent to the CMTS 12 which forwards the IP 54 packets to the CM 16 on a downstream channel via the cable network 14. The CM 16 sends response IP 54 packets back to the data network 28 via the PSTN 22 and the TRAC 24.

Figure 7:
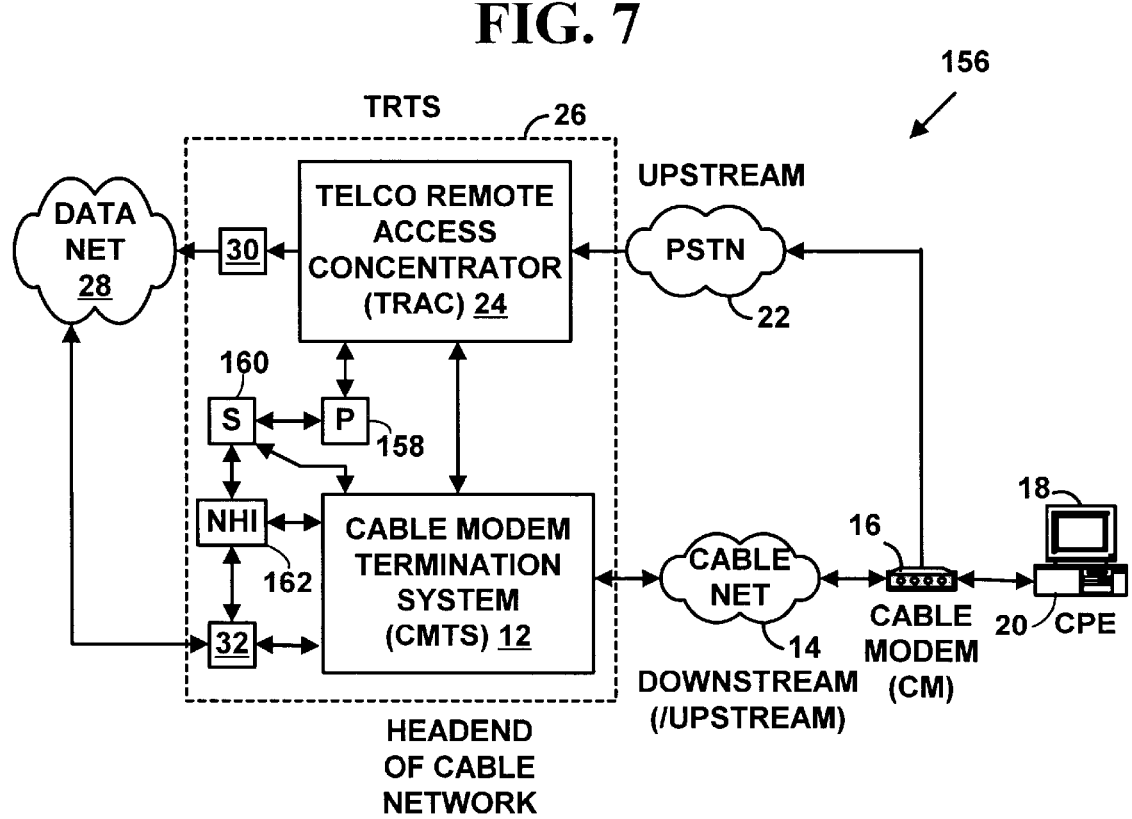
FIG. 7 is a block diagram illustrating a data-over-cable system for the method illustrated in FIGS. 6A and 6B.

FIG. 7 is a block diagram illustrating a data-over-cable system 156 for the method illustrated in FIGS. 6A and 6B. The Data-over-cable system 156 includes DHCP 66 proxies 158, DHCP 66 servers 160, and associated Network Host Interfaces 162 available on the CMTS 12. Multiple DHCP 66 proxies 158, DHCP 66 servers 160, and network host interfaces 162 are illustrated as single boxes in FIG. 7. FIG. 7 also illustrates DHCP 66 proxies 158 separate from the TRAC 24. In one embodiment of the present invention, a TRAC 24 includes DHCP 66 proxy functionality and no separate DHCP 66 proxies 158 are used. In such an embodiment, the TRAC 24 forwards DHCP 66 messages using the DHCP 66 giaddr-field 130 to DHCP 66 servers 160 available on the CMTS 12.

Figure 8:
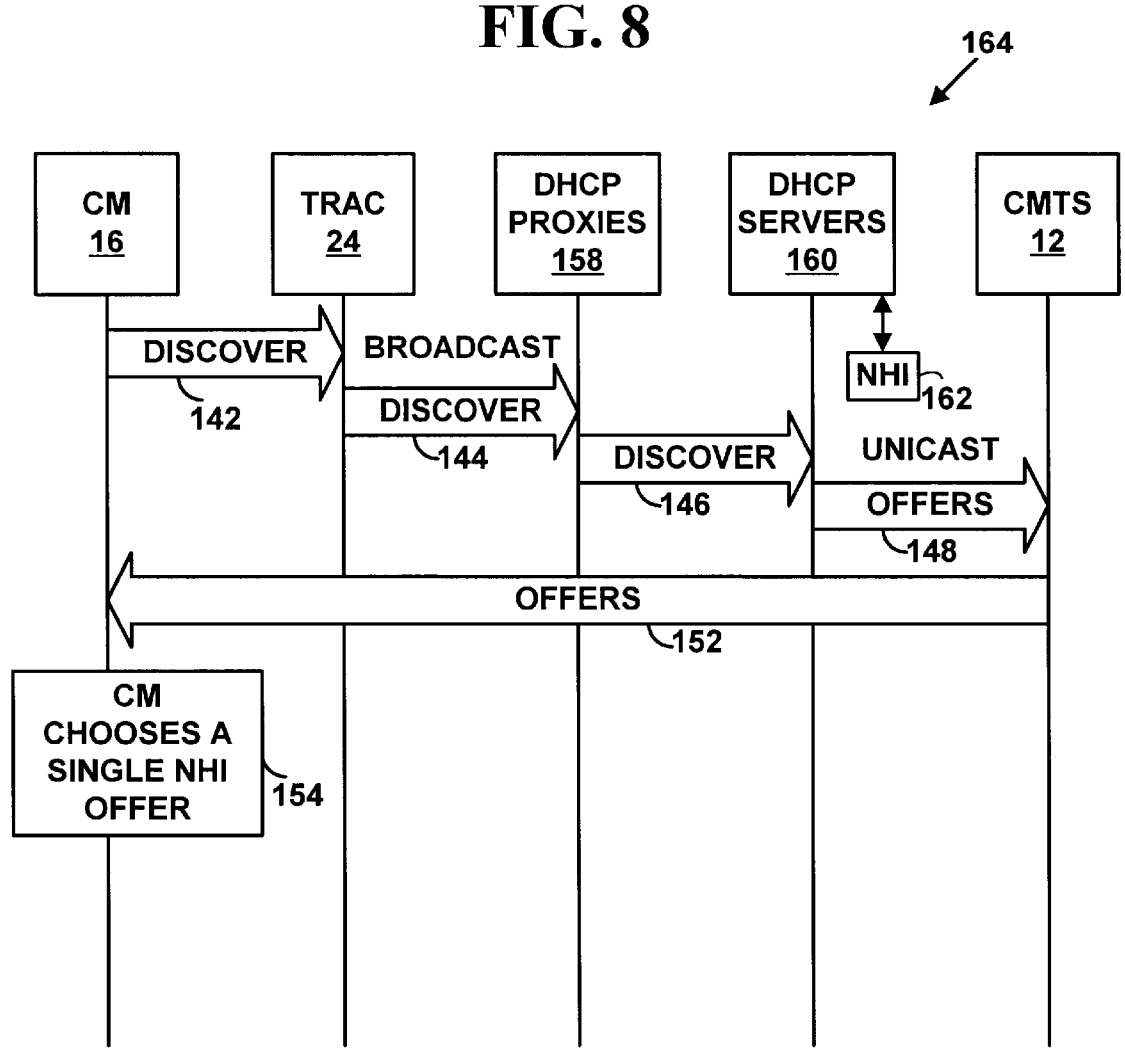
FIG. 8 is a block diagram illustrating the message flow of the method illustrated in FIGS. 6A and 6B.

FIG. 8 is a block diagram illustrating a message flow 164 of Method 140 (FIGS. 6A and 6B). Message flow 164 includes DHCP proxies 158 and DHCP servers 160 illustrated in FIG. 7. Steps 142, 144, 146, 148, 152 and 154 of Method 140 (FIGS. 6A and 6B) are illustrated in FIG. 8. In one embodiment of the present invention, the DHCP proxies 158 are not separate entities, but are included in the TRAC 24. In such an embodiment, the DHCP proxy services are provided directly by the TRAC 24.

Resolving Addresses for Network Host Interfaces

Figure 9B:
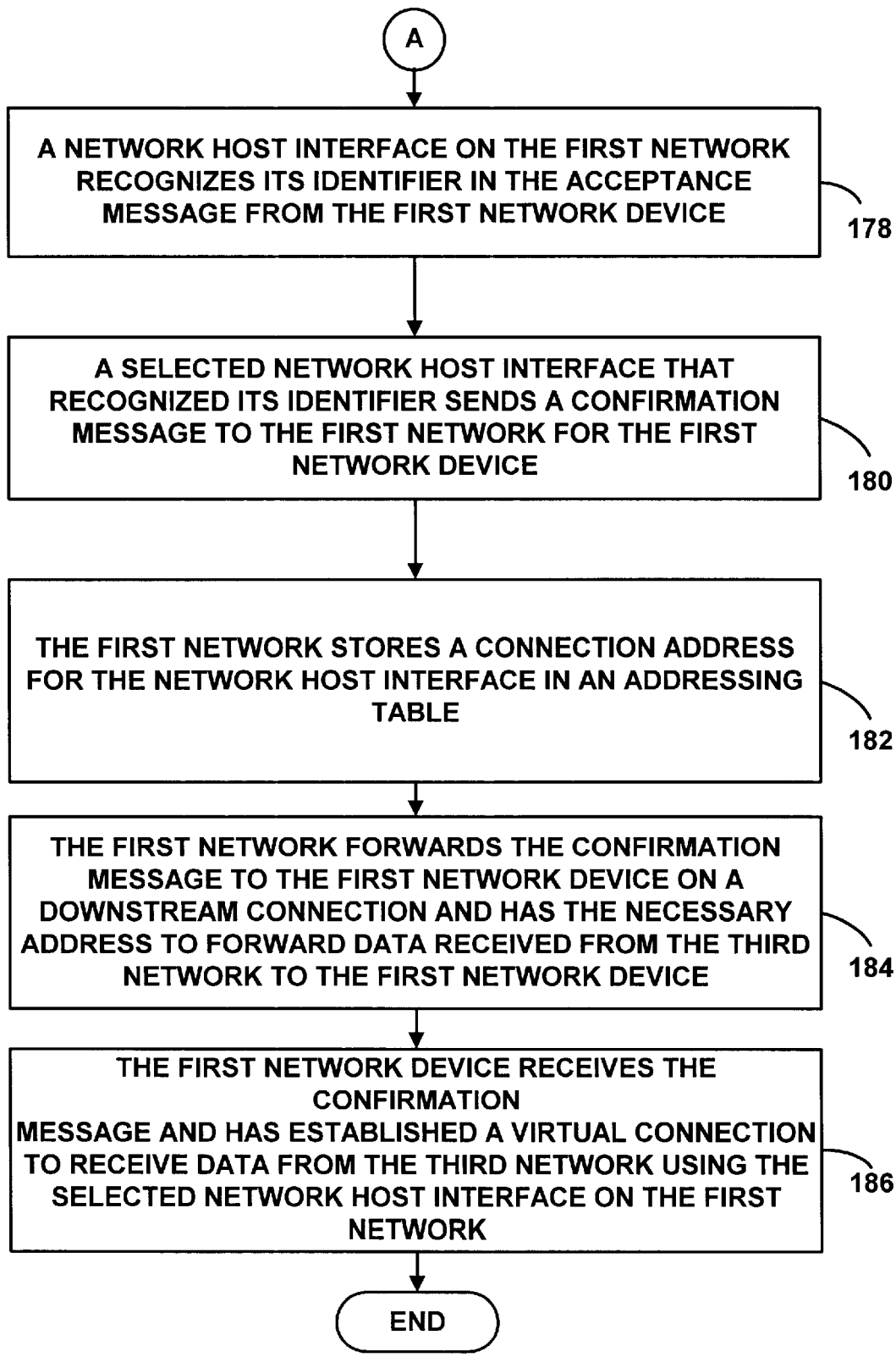

Since a CM 16 receives multiple DHCPOFFER messages (Step 152 FIG. 6B) the CM 16 resolves and acknowledges one offer from a selected network host interface. FIGS. 9A and 9B are a flow diagram illustrating a Method 166 for resolving and acknowledging host addresses in a data-over-cable system. Method 166 includes a first network device that is connected to a first network with a downstream connection of a first connection type, and connected to a second network with an upstream connection of a second connection type. The first and second networks are connected to a third network with a third connection type. In one embodiment of the present invention, the first network device is the CM 16, the first network is the cable network 14, the second network is the PSTN 22 and the third network is the data network 28 (e.g., the Internet). The downstream connection is a cable television connection, the upstream connection is a telephony connection, and the third connection is an IP connection.

Turning to FIG. 9A, one or more offer messages are received on the first network device from the first network on the downstream connection at Step 168. The one or more offer messages are offers from one or more network host interfaces available on the first network to provide the first network device a connection to the third network. The first network device selects one of the network host interfaces using message fields in one of the one or more offer messages at Step 170. The first network device creates an acceptance message with a second message type to accept the offered services from a selected network host interface at Step 172. The acceptance message includes a connection address for the first network in a first message field and an identifier to identify the selected network host interface in a second message field.

The first network device sends the acceptance message over the upstream connection to the second network at Step 174. The second network uses the first message field in the acceptance message to forward the acceptance message to the one or more network host interfaces available on first network at Step 176.

A network host interface available on the first network identified in second message field in the acceptance message from the first network device recognizes an identifier for the network host interface at 178 in FIG. 9B. The selected network host interface sends a confirmation message with a third message type to the first network at Step 180. The confirmation message is a confirmation for the first network device that the selected network host interface received the acceptance message from the first network device. The first network stores a connection address for the selected network interface in one or more tables on the first network at Step 182. The first network will forward data from the third network to the first network device when it is received on the selected network host interface using the connection address in the one or more routing tables. The routing tables are explained below. The first network forwards the confirmation message to the first network device on the downstream connection at Step 184. The first network device receives the confirmation message at Step 186. The first network and the first network device have the necessary addresses for a virtual connection that allows data to be sent from the third network to a network host interface on the first network, and from the first network over the downstream connection to the first network device. Method 166 accomplishes resolving network interface hosts addresses from a cable modem in a data-over-cable with telephony return.

Method 166 of the present invention is used in data-over-cable system 10 with telephony return. However, the present invention is not limited to data-over-cable system 10 with telephony return and can be used in data-over-cable system 10 without telephony return by using an upstream cable channel instead of an upstream telephony channel.

FIGS. 10A and 10B are a flow diagram illustrating a Method 188 for resolving discovered host addresses in data-over-cable system 10 with telephony return. At Step 190 in FIG. 10A, a CM 16 receives one or more DHCPOFFER messages from one or more DHCP 66 servers associated with one or more network host interfaces (e.g., at Step 168 in Method 166). The one or more DHCPOFFER messages include DHCP 66 fields set as illustrated in Table 7 above. However, other field settings could also be used. At Step 192, the CM 16 selects one of the DHCPOFFER messages (see also, Step 170 in Method 166). At Step 194, the CM 16 creates a DHCP 66 request message ("DHCPREQUEST") message to request the services offered by a network host interface selected at Step 192. The fields of the DHCP request message are set as illustrated in Table 8. However, other field settings may also be used.

TABLE 8

| DHCP 66 Parameter | Description |
| --- | --- |
| OP 110 | Set to BOOTREQUEST. |
| HTYPE 112 | Set to network type (e.g., one for 10 Mbps Ethernet). |

TABLE 8-continued

| DHCP 66 Parameter | Description |
| --- | --- |
| HLEN 114 | Set to network length (e.g., six for 10 Mbps Ethernet) |
| HOPS 116 | Set to a large number. |
| FLAGS 118 | Set BROADCAST bit to zero. |
| CIADDR 124 | If the CM 16 has previously been assigned an IP address, the IP address is placed in this field. If the CM 16 has previously been assigned an IP address by DHCP 66, and also has been assigned an address via IPCP, the CM 16 places the DHCP 66 IP 54 address in this field. |
| YIADDR 126 | The IP 54 address sent from the selected network interface host in DHCPOFFER message |
| GIADDR 130 | The CM 16 places the Downstream Channel IP 54 address 80 that the CMTS 12 obtained in the TSI message 76 on a cable downstream channel in this field. |
| CHADDR 132 | The CM 16 places its 48-bit MAC 44 LAN address in this field. |
| SNAME 134 | The DHCP 66 server identifier for the selected network interface host |

The DHCPREQUEST message is used to "request" services from the selected IP 54 host interface available on the CMTS 12 using a DHCP 66 server associated with the selected network host interface. The DHCP 66 giaddr-field 130 (FIG. 5) includes the downstream channel IP address 80 for the CMTS 12 obtained in the TSI message 76 (e.g., the first message-field from Step 172 of Method 166). Putting the downstream channel IP address 80 obtained in the TSI message 76 allows the DHCPREQUEST message to be forwarded by the TRAC 24 to the DHCP 66 servers associated with network host interfaces available on the CMTS 12. The DHCP 66 giaddr-field 126 contains an identifier (second message field, Step 172 in Method 166). The DHCP 66 sname-field 134 contains a DHCP 66 server identifier associated with the selected network host interface.

If the DHCP 66 giaddr-field 130 in a DHCP message from a DHCP 66 client is non-zero, a DHCP 66 server sends any return messages to a DHCP 66 server port on a DHCP 66 relaying agent (e.g., CMTS 12) whose address appears in the DHCP 66 giaddr-field 130. If the DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124, or to the client's hardware address specified in the DHCP 66 chaddr-field 132 or to the local subnet broadcast address.

Returning to FIG. 10A at Step 196, the CM 16 sends the DHCPREQUEST message on the upstream connection to the TRAC 24 via the PSTN 22. At Step 198, a DHCP 66 layer on the TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies. The DHCP 66 proxies accept DHCP 66 messages originally from the CM 16 destined for DHCP 66 servers associated with network host interfaces available on the CMTS 12. In another embodiment of the present invention, TRAC 24 provides the DHCP 66 proxy functionality, and no separate DHCP 66 proxies are used.

The one or more DHCP 66 proxies on the TRAC's 24 local network message forwards the DHCPOFFER to one or more of the DHCP 66 servers associated with network host interfaces (e.g., IP 54 interfaces) available on the CMTS 12 at Step 200 in FIG. 10B. Since the DHCP 66 giaddr-field 130 in the DHCPDISCOVER message sent by the CM 16 is already non-zero (i.e., contains the downstream IP address of CMTS 12), the DHCP 66 proxies leave the DHCP 66 giaddr-field 130 intact.

One or more DHCP 66 servers for the selected network host interfaces (e.g., IP 54 interface) available on the CMTS 12 receives the DHCPOFFER message at Step 202. A selected DHCP 66 server recognizes a DHCP 66 server identifier in DHCP 66 sname-field 134 or the IP 54 address that was sent in the DHCPOFFER message in the DHCP 66 yiaddr-field 126 from the DHCPREQUST message as being for the selected DHCP 66 server.

The selected DHCP 66 server associated with network host interface selected by the CM 16 in the DHCPRE-QUEST message creates and sends a DHCP 66 acknowledgment message ("DHCPACK") to the CMTS 12 at Step 204. The DHCPACK message is sent with the message fields set as illustrated in Table 9. However, other field settings can also be used. The DHCP 66 yiaddr-field again contains the IP 54 address for the selected network host interface available on the CMTS 12 for receiving data packets from the data network 28.

TABLE 9

| DHCP 66 Parameter | Description |
| --- | --- |
| FLAGS 122 | Set a BROADCAST bit to zero. |
| YIADDR 126 | The IP 54 address for the selected network host interface to allow the CM 16 to receive data from the data network 28. |
| SIADDR 128 | An IP 54 address for a TFTP 64 server to download configuration information for an interface host. |
| CHADDR 132 | The MAC 44 address of the CM 16. |
| SNAME 134 | A DHCP 66 server identifier associated with the selected network host interface. |
| FILE 136 | A configuration file name for an network interface host. |

The selected DHCP 66 server sends the DHCACK message to the address specified in the DHCP 66 giaddr-field 130 from the DHCPREQUEST message to the CM 16 to verify the selected network host interface (e.g., IP 54 interface) will offer the requested service (e.g., IP 54 service).

At Step 206, the CMTS 12 receives the DHCPACK message from the selected DHCP 66 server associated with the selected network host interface IP 54 address(e.g., IP 54 interface). The CMTS 12 examines the DHCP 66 yiaddr-field 126 and the DHCP 66 chaddr-field 132 in the DHCPOFFER messages. The DHCP 66 yiaddr-field 126 contains an IP 54 address for a network host IP 54 interface available on the CMTS 12 and used for receiving IP 54 data packets from the data network 28 for the CM 16. The DHCP 66 chaddr-field 132 contains the MAC 44 layer address for the CM 16 on a downstream cable channel from the CMTS 12 via the cable network 14.

The CMTS 12 updates an Address Resolution Protocol ("ARP") table and other routing tables on the CMTS 12 to reflect the addresses in the DHCP 66 yiaddr-field 126 and the DHCP 66 chaddr-field 132 at Step 208. As is known in the art, ARP allows a gateway such as the CMTS 12 to forward any datagrams from a data network such as data network 28 it receives for hosts such as a CM 16. ARP is defined in RFC-826, incorporated herein by reference.

The CMTS 12 stores a pair of network address values in the ARP table, the IP 54 address of the selected network host interface from the DHCP 66 yiaddr-field 126 and a Network Point of Attachment ("NPA") address. In an illustrative embodiment of the present invention, The NPA address is a MAC 44 layer address for a CM 16 via a downstream cable channel. The IP/NPA address pair are stored in local routing tables with the IP/NPA addresses of hosts (e.g., CMs 16) that are attached to a cable network 14. The entries in the ARP table are described below.

At Step 210, CMTS 12 sends the DHCPACK message to the CM 16 via the cable network 14. At Step 212, the CM 16 receives the DHCPACK message, and along with the CMTS 12 has addresses for a virtual connection between the data network 28 and the CM 16. When data packets arrive on the IP 54 address for the selected host interface they are sent to the CMTS 12 and the CMTS 12 forwards them using a NPA (i.e., MAC 44 address) from the routing tables on a downstream channel via the cable network 14 to the CM 16.

If a BROADCAST bit in the flags field 124 is set to one in the DHCPACK, the CMTS 12 sends the DHCPACK messages to a broadcast IP 54 address (e.g., 255.255.255.255). The DHCP 66 chaddr-field 132 is still used to determine that MAC layer address. If the BROADCAST bit in the flags field 122 is set, the CMTS 12 does not update the ARP table or offer routing tables based upon the DHCP 66 yiaddr-field 126 and the DHCP 66 chaddr-field 132 pair when a broadcast message is sent.

FIG. 11 is a block diagram illustrating the message flow 214 of the Method 188 illustrated in FIGS. 10A and 10B. Message flow 214 includes DHCP proxies 158 and DHCP servers 160 illustrated in FIG. 7. Method Steps 194, 196, 198, 204, 208, 210 and 212 of Method 188 (FIGS. 10A and 10B) are illustrated in FIG. 11. In one embodiment of the present invention, DHCP proxies 158 are not separate entities, but are included in a TRAC 24. In such an embodiment, the DHCP proxy services are provided directly by the TRAC 24.

In the event that the CM 16 is not compatible with the configuration of the network host interface received in the DHCPACK message, the CM 16 may generate a DHCP 66 decline message ("DHCPDECLINE") and transmit it to the TRAC 24 via the PSTN 22. A DHCP 66 layer in the TRAC 24 forwards the DHCPDECLINE message to the CMTS 12. Upon seeing a DHCPDECLINE message, the CMTS 12 flushes its ARP tables and routing tables to remove the now invalid IP/MAC pairing. If an IP 54 address for a network host interface is returned that is different from the IP 54 address sent by the CM 16 in the DCHCPREQUEST message, the CM 16 uses the IP 54 address it receives in the DHCPACK message as the IP 54 address of the selected network host interface for receiving data from the data network 28.

The present invention is described with respect to, but is not limited to a data-over-cable-system with telephony return. Method 188 can also be used with a cable modem that has a two-way connection (i.e., upstream and downstream) to a cable network 14 and a CMTS 12. In a data-over-cable-system without telephony return, a CM 16 would broadcast the DHCPREQUEST message to one or more DHCP 66 servers associated with one or more network host interfaces available on a CMTS 12 using an upstream connection on a data network 14 including the IP 54 address of the CMTS 12 in the DHCP 66 giaddr-field 130. Method 188 accomplishes resolving addresses for network interface hosts from a cable modem in a data-over-cable with or without telephony return, and without extensions to the existing DHCP protocol.

After Method 188, the CMTS 12 has a valid IP/MAC address pair in one or more address routing tables including an ARP table to forward IP 54 data packets from the data network 28 to the CM 16, thereby creating a virtual IP 54 data path to/from the CM 16 as was illustrated in Table 3. The CM 16 has necessary parameters to proceed to the next phase of initialization, a download of a configuration file via TFTP 64. Once the CM 16 has received the configuration file and has been initialized, it registers with the CMTS 12 and is ready to receive data from the data network 14. The download of the configuration file and registration are discussed below.

CPE Initialization in a Data-over-cable System

Figure 12A:
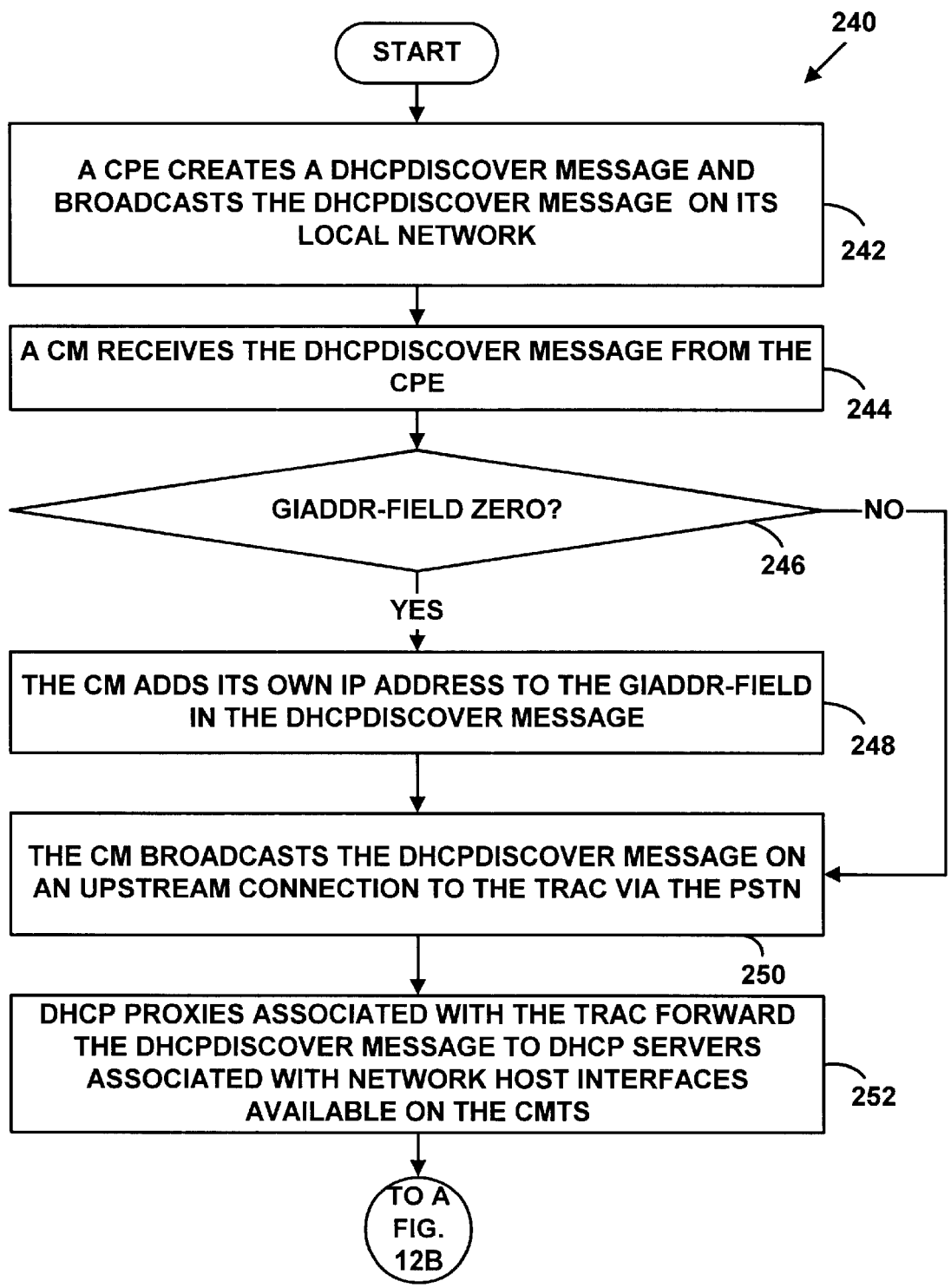

CPE 18 also uses DHCP 66 to generate requests to obtain IP 54 addresses to allow CPE 18 to also receive data from the data network 28 via the CM 16. In an illustrative embodiment of the present invention, the CM 16 functions as a standard BOOTP relay agent/DHCP Proxy 158 to facilitate the CPE's 18 access to a DHCP 66 server 160. FIGS. 12A and 12B are a flow diagram illustrating a Method 240 for obtaining addresses for customer premise equipment. The CM 16 and the CMTS 12 use information from Method 240 to construct IP 54 routing and ARP table entries for network host interfaces 162 providing data to the CMCI 20 and to the CPE 18.

FIGS. 12A and 12B are a flow diagram illustrating a Method 240 for addressing network host interfaces from the CPE 18. At step 242 in FIG. 12A, the CPE 18 generates a DHCPDISCOVER message and broadcasts the DHCPDISCOVER message on its local network with the fields set as illustrated in Table 6 above with addresses for the CPE 18 instead of the CM 16. However, more or fewer fields could also be set. The CM 16 receives the DHCPDISCOVER as a standard BOOTP relay agent at Step 244. The DHCP DISCOVER message has a MAC 44 layer address for the CPE 18 in the DHCP 66 chaddr-field 132, which the CM 16 stores in one or more routing tables. As a BOOTP relay agent, the CM 16 checks the DHCP 66 giaddr-field 130 (FIG. 5) at Step 246. If the DHCP 66 giaddr-field 130 is set to zero, the CM 16 puts its IP 54 address into the DHCP 66 giaddr-field 130 at Step 248.

If the DHCP 66 giaddr-field 130 is non-zero, the CM 16 does not alter the DHCP 66 giaddr-field 130 since there could be another BOOTP relay agent attached to the CPE 18 which may have already set the DHCP 66 giaddr-field 130. Any BOOTP relay agent attached to the CPE 18 would also have acquired its IP 54 address from using a DHCP 66 discovery process (e.g., FIG. 11).

Returning to FIG. 12A, at Step 250, the CM 16 broadcasts the DHCPDISCOVER message to a broadcast address via the PSTN 22 to the TRAC 24. In one embodiment of the present invention, the broadcast address is an IP 54 broadcast address (e.g., 255.255.255.255). At Step 252, one or more DHCP 66 proxies 158 associated with the TRAC 24, recognize the DHCPDISCOVER message, and forward it to one or more DHCP 66 servers 160 associated with one or more network host interfaces 162 available on the CMTS 12. Since the DHCP 66 giaddr-field 130 is already non-zero, the DHCP proxies leave the DHCP 66 giaddr-field 130 intact. In another embodiment of the present invention, the TRAC 24 includes the DHCP 66 proxy 158 functionality and no separate DHCP 66 proxies 158 are used.

At Step 254 in FIG. 12B, the one or more DHCP servers 160 receive the DHCPDISCOVER message from one or more DHCP proxies, and generate one or more DHCPOFFER messages to offer connection services for one or more network host interfaces 162 available on the CMTS 12 with the fields set as illustrated in Table 7. The one or more DHCP servers 160 send the one or more DHCPOFFER messages to the address specified in the DHCP 66 giaddr-field 130 (e.g., the CM 16 or a BOOTP relay agent on the CPE 18), which is an IP 54 address already contained in an ARP or other routing table in the CMTS 12. The CMTS network address table is discussed below. Since the CMTS 12 also functions as a relay agent for the one or more DHCP servers 160, the one or more DHCPOFFER messages are received on the CMTS 12 at Step 256.

The CMTS 12 examines the DHCP 66 yiaddr-field 126 and the DHCP 66 giaddr-field 130 in the DHCPOFFER messages, and sends the DHCPOFFER messages down cable network 14 to the IP 54 address specified in the giaddr-field 130. The MAC 44 address for the CM 16 is obtained through a look-up of the hardware address associated with the DHCP 66 giaddr-field 130. If the BROADCAST bit in the DHCP 66 flags-field 122 is set to one, the CMTS 12 sends the DHCPOFFER message to a broadcast IP 54 address (e.g., 255.255.255.255), instead of the address specified in the DHCP 66 yiaddr-field 126. The CMTS 12 does not update its ARP or other routing tables based upon the broadcast DHCP 66 yiaddr-field 126 DHCP 66 chaddr-field 132 address pair.

Returning to FIG. 12B, the CM 16 receives the one or more DHCPOFFER messages and forwards them to the CPE 18 at Step 258. The CM 16 uses the MAC 44 address specified by the DHCP 66 chaddr-field 132 look-up in its routing tables to find the address of the CPE 18 even if the BROADCAST bit in the DHCP 66 flags-field 122 is set. At Step 260, the CPE 18 receives the one or more DHCPOFFER messages from the CM 16. At Step 262, the CPE 18 selects one of the DHCPOFFER messages to allow a virtual connection to be established between the data network 28 and the CPE 18. Method 240 accomplishes addressing network interface hosts from the CPE 18 in a data-over-cable system 10 without extensions to the existing DHCP protocol.

Figure 13B:
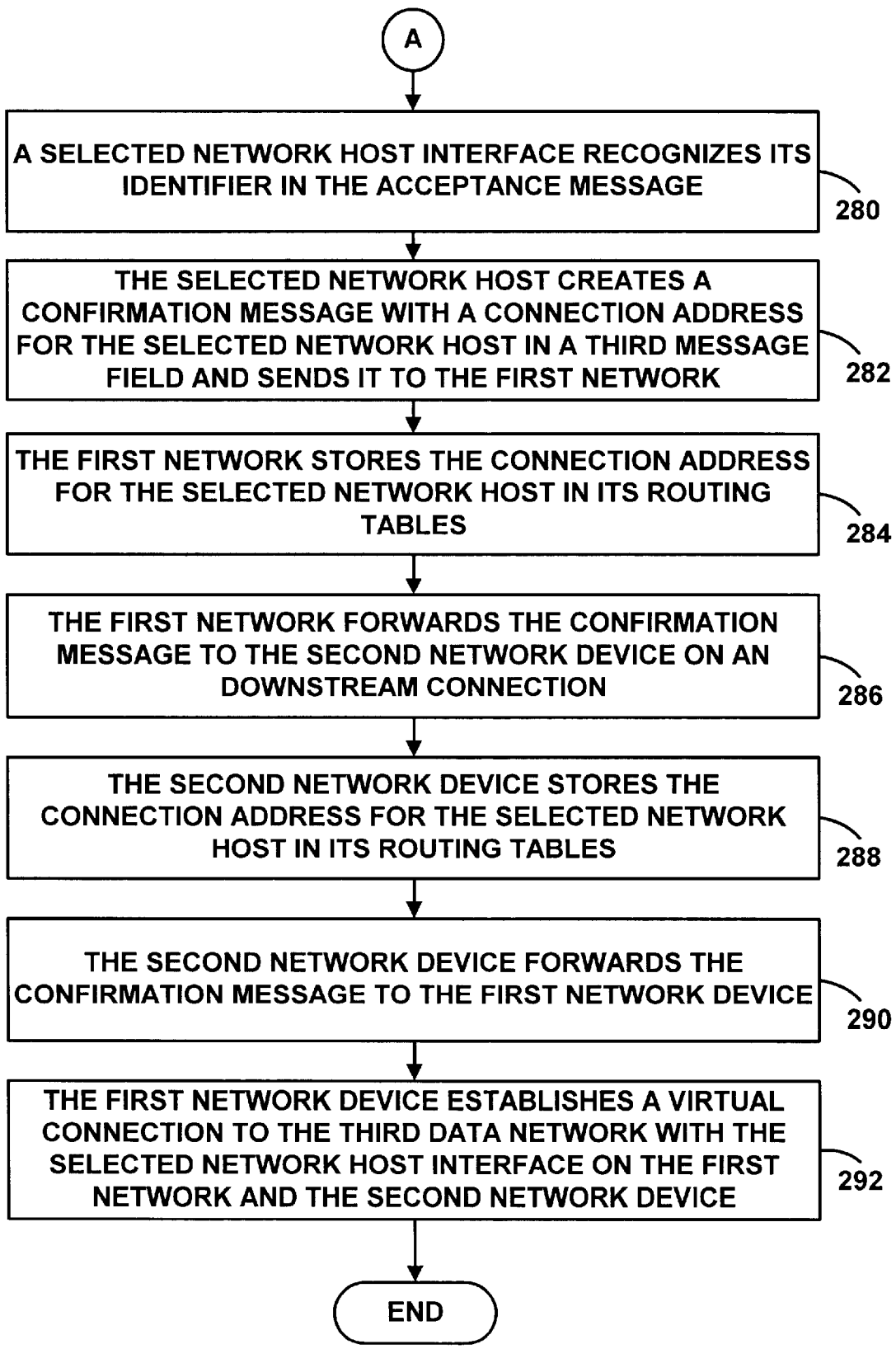

FIGS. 13A and 13B are a flow diagram illustrating a Method 266 for resolving addresses for the network host interface selected by a first network device to create a virtual connection to the third network. Turning to FIG. 13A, at Step 268 one or more offer messages are received with a second message type on the first network device from the second network device from the first network on a downstream connection. The one or more offer messages are offers from one or more protocol servers associated with one or more network host interfaces available on the first network to provide the first network device a connection to the third network. The first network device selects one of the network host interfaces using one of the one or more offer messages at Step 270. The first network device creates an acceptance message with a third message type to accept the offered services from the selected network host interface at Step 272. The acceptance message includes a connection address for the first network in a first message field and an identifier to identify the selected network host interface in a second message field. At Step 274, first network device equipment sends the acceptance message to the second network device.

The second network device sends the acceptance message over the upstream connection to the second network at Step 276. The second network uses the first message field in the acceptance message to forward the acceptance message to the one or more network host interfaces available on first network at Step 278.

A network host interface available on the first network identified in second message field in the acceptance message from the first network device recognizes an identifier for the selected network host interface at Step 280 in FIG. 13B. The selected network host interface sends a confirmation message with a fourth message type to the first network at Step 282. The fourth message is a confirmation for the first network device that the selected network host interface received the acceptance message. The confirmation message includes a second connection address in a third message field. The second connection address is a connection address for the selected network host interface. The first network stores the connection address for the selected network interface from the third message in one or more routing tables (e.g., an ARP table) on the first network at Step 284. The first network will forward data from the third network to the first network device via the second network device when it is received on the selected network host interface using the connection address from the third message field. The first network forwards the confirmation message to the second network device on the downstream connection at Step 286. The second network device receives the confirmation message and stores the connection address from the third message field for the selected network interface in one or more routing tables on the second network device at Step 288. The connection address for the selected network interface allows the second network device to forward data from the third network sent by the selected network interface to the customer premise equipment.

At Step 290, the second network device forward the confirmation message to the first network device. At Step 292, the first network device establishes a virtual connection between the third network and the first network device.

After Step 292, the first network, the second network device and the first network device have the necessary connection addresses for a virtual connection that allows data to be sent from the third network to a network host interface on the first network, and from the first network over the downstream connection to the second network and then to the first network device. In one embodiment of the present invention, Method 266 accomplishes resolving network interface hosts addresses from customer premise equipment with a cable modem in a data-over-cable with telephony return without extensions to the existing DHCP protocol.

Method 266 of the present invention is used in a data-over-cable system 10 with telephony return with a CM 16 and a CPE 18. However, the present invention is not limited to a data-over-cable system 10 with telephony return and can be used in a data-over-cable system 10 without telephony return by using an upstream cable channel instead of an upstream telephony channel.

Figure 14B:
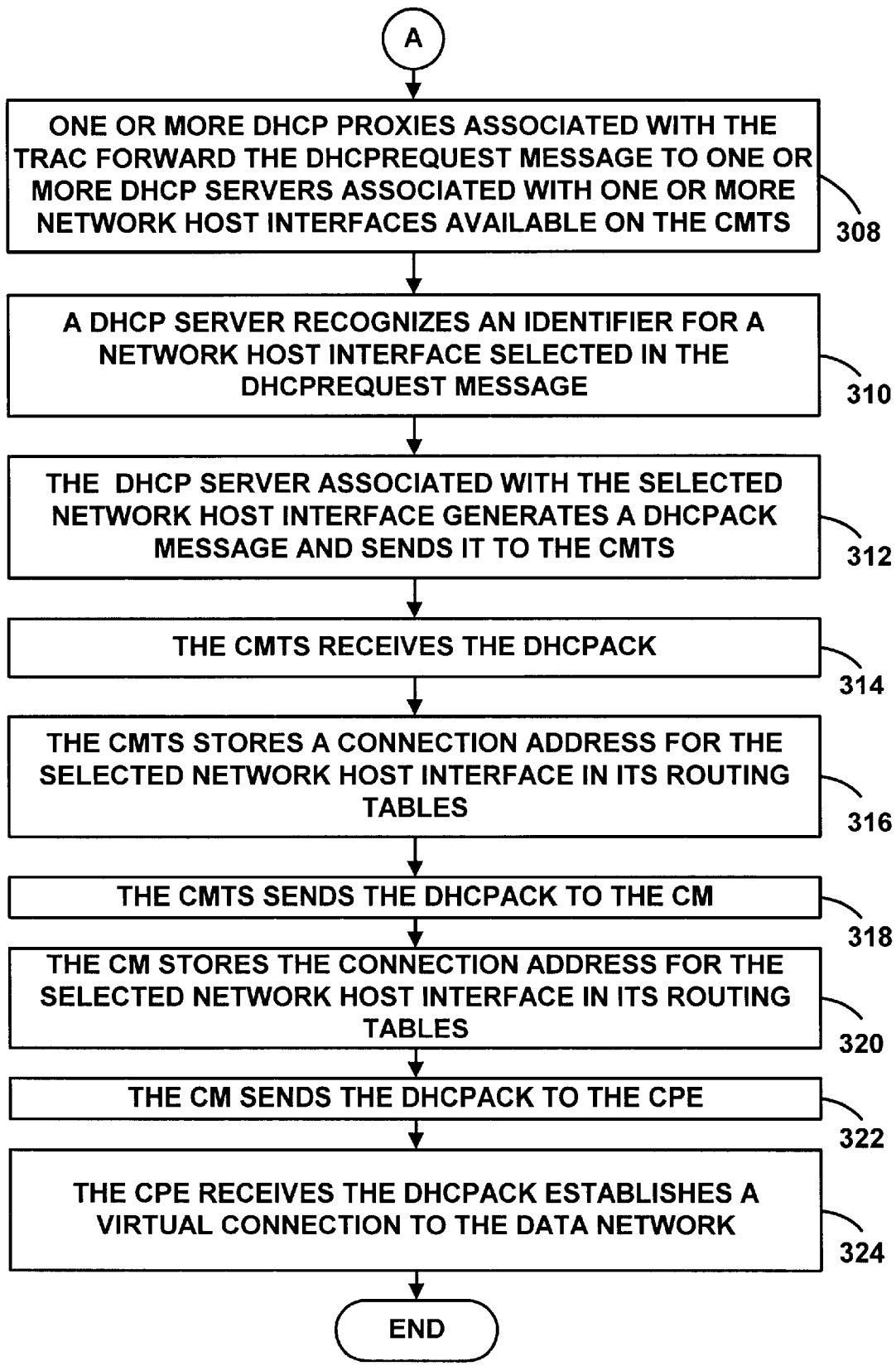

FIGS. 14A and 14B are a flow diagram illustrating a Method 294 for resolving network host interfaces from a CPE 18. At Step 296, the CPE 18 receives the one or more DHCPOFFER messages from one or more DHCP 66 servers associated with one or more network host interface available on the CMTS 12. At Step 298, the CPE 18 chooses one offer of services from a selected network host interface. At Step 300, the CPE 18 generates a DHCPREQUEST message with the fields set as illustrated in Table 8 above with addresses for the CPE 18 instead of the CM 16. However, more or fewer fields could also be set. At Step 302, the CPE 18 sends the DHCPREQUEST message to the CM 16. At Step 304, the CM 16 forwards the message to the TRAC 24 via the PSTN 22.

At Step 306, a DHCP 66 layer on the TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies. The DHCP 66 proxies accept the DHCP 66 messages originally from the CPE 18 destined for the DHCP 66 servers associated with network host interfaces available on the CMTS 12. In another embodiment of the present invention, the TRAC 24 provides the DHCP 66 proxy functionality, and no separate DHCP 66 proxies are used.

One or more DHCP 66 proxies on the TRAC's 24 local network recognize the DHCPOFFER message and forward it to one or more of the DHCP 66 servers associated with network host interfaces (e.g., IP 54 interfaces) available on the CMTS 12 at Step 308 in FIG. 14B. Since the DHCP 66 giaddr-field 130 in the DHCPDISCOVER message sent by the CPE 18 is already non-zero, the DHCP 66 proxies leave the DHCP 66 giaddr-field 130 intact.

One or more DHCP 66 servers for the selected network host interfaces (e.g., IP 54 interface) available on the CMTS 12 receive the DHCPOFFER message at Step 310. A selected is DHCP 66 server recognizes a DHCP 66 server identifier in the DHCP 66 sname-field 134 or the IP 54 address that was sent in the DHCPOFFER message in the DHCP 66 yiaddr-field 126 from the DHCPREQUST message for the selected DHCP 66 server.

The selected DHCP 66 server associated with network host interface selected by the CPE 18 in the DHCPREQUEST message creates and sends a DHCP acknowledgment message ("DHCPACK") to the CMTS 12 at Step 312 using the DHCP 66 giaddr-field 130. The DHCPACK message is sent with the message fields set as illustrated in Table 9. However, other field settings can also be used. The DHCP 66 yiaddr-field contains the IP 54 address for the selected network host interface available on the CMTS 12 for receiving the data packets from data network 28 for the CPE 18.

At Step 314, the CMTS 12 receives the DHCPACK message. The CMTS 12 examines the DHCP 66 giaddr-field 130 and looks up that IP address in its ARP table for an associated MAC 44 address. This is a MAC 44 address for the CM 16 which sent the DHCPREQUEST message from the CPE 18. The CMTS 12 uses the MAC 44 address associated with the DHCP 66 giaddr-field 130 and the DHCP 66 yiaddr-field 126 to update its routing and ARP tables reflecting this address pairing at Step 316. At Step 318, the CMTS 12 sends the DHCPACK message on a downstream channel on the cable network 14 to the IP 54 and MAC 44 addresses, respectively (i.e., to the CM 16). If the BROADCAST bit in the DHCP 66 flags-field 122 is set to one, the CMTS 12 sends the DHCPACK message to a broadcast IP 54 address (e.g., 255.255.255.255), instead of the address specified in the DHCP 66 yiaddr-field 126. The CMTS 12 uses the MAC 44 address associated with the DHCP 66 chaddr-field 130 even if the BROADCAST bit is set.

The CM 16 receives the DHCPACK message. It examines the DHCP 66 yiaddr-field 126 and chaddr-field 132, and updates its routing table and an ARP routing table to reflect the address pairing at Step 320. At Step 322, the CM 16 sends the DHCPACK message to the CPE 18 via the CMCI 20 at the IP 54 and MAC 44 addresses respectively from its routing tables. If the BROADCAST bit in the DHCP 66 flags-field 122 is set to one, the CM 16 sends the downstream packet to a broadcast IP 54 address (e.g., 255.255.255.255), instead of the address specified in the DHCP 66 yiaddr-field 126. The CM 16 uses the MAC 44 address specified in the DHCP 66 chaddr-field 132 even if the BROADCAST bit is set to the located CPE 18. At Step 324, the CPE 18 receives the DHCPACK from the CM 16 and has established a virtual connection to the data network 28.

In the event that the CPE 18 is not compatible with the configuration received in the DHCPACK message, the CPE 18 may generate a DHCP 66 decline ("DHCPDECLINE") message and send it to the CM 16. The CM 16 will transmit the DHCPDECLINE message up the PPP 50 link via the PSTN 22 to the TRAC 24. On seeing a DHCPDECLINE message the TRAC 24 sends a unicast copy of the message to the CMTS 12. The CM 16 and CMTS 12 examine the DHCP 66 yiaddr-field 126 and giaddr-field 130, and update their routing and ARP tables to flush any invalid pairings.

Figure 15:
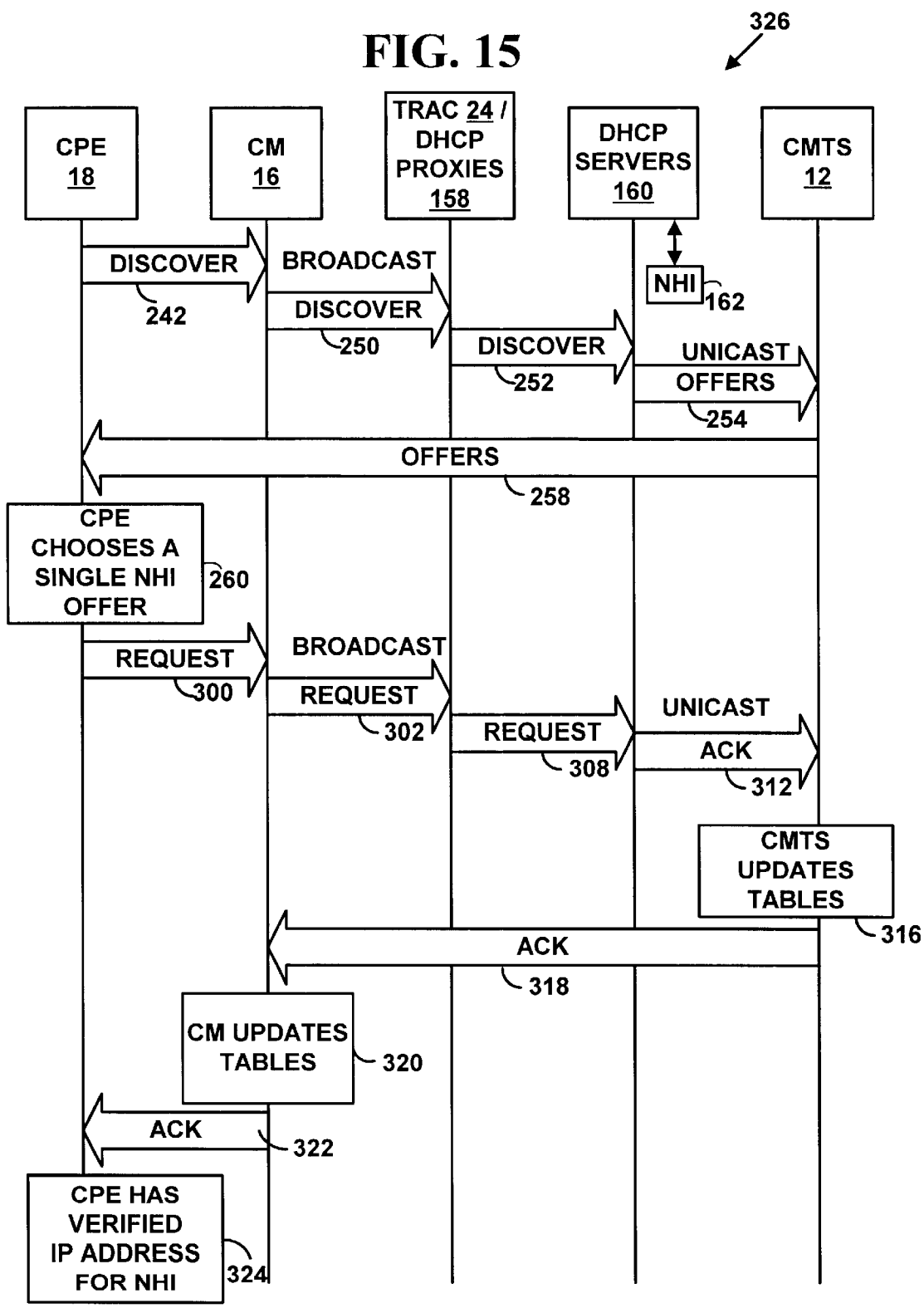
FIG. 15 is a block diagram illustrating a message flow for the methods in FIGS. 12A, 12B, and 14A and 14B.

FIG. 15 is a block diagram illustrating a message flow 326 for Methods 240 and 294 in FIGS. 12A, 12B, and 14A and 14B. Message flow 326 illustrates a message flow for Methods 240 and 294, for a data-over-cable system with and without telephony return. In another embodiment of the present invention, a CM 16 forwards requests from a CPE 18 via an upstream connection on a cable network 14 to DHCP servers 160 associated with one or more network host interfaces available on a CMTS 12.

Upon completion of Methods 240 and 294, the CM 16 and the CMTS 12 have valid IP/MAC address pairings in their routing and ARP tables. These tables store the same set of IP 54 addresses, but do not associate them with the same MAC 44 addresses. This is because the CMTS 12 resolves all CPE 18 IP 54 addresses to the MAC 44 address of a corresponding CM 16. The CMs 16, on other hand, are able to address the respective MAC 44 addresses of their CPEs 18. This also allows DHCP 66 clients associated with the CPE 18 to function normally since the addressing that is done in the CM 16 and CMTS 12 is transparent to CPE 18 hosts.

Methods 240 and 294 accomplish resolving addresses for network interface hosts from customer premise equipment in a data-over-cable with or without telephony return without extensions to the existing DHCP protocol. Methods 240 and 294 are used in a data-over-cable system 10 with telephony return. However, the present invention is not limited to a data-over-cable system 10 with telephony return and can be used in a data-over-cable system 10 without telephony return by using an upstream cable channel instead of an upstream telephony channel.

It will be appreciated that the acts and symbolically represented operations include the manipulation of electrical signals. The electrical signals represent data bits which cause a resulting transformation or reduction of the electrical signal representation, and the maintenance of data bits at memory locations in the memory system to thereby reconfigure or otherwise alter a CPU's operation, as well as other processing of signals. The memory locations where data bits, such as the entries in an ARP table, are maintained are physical locations that have particular electrical, magnetic, optical, or organic properties corresponding to the data bits.

Figure 16:
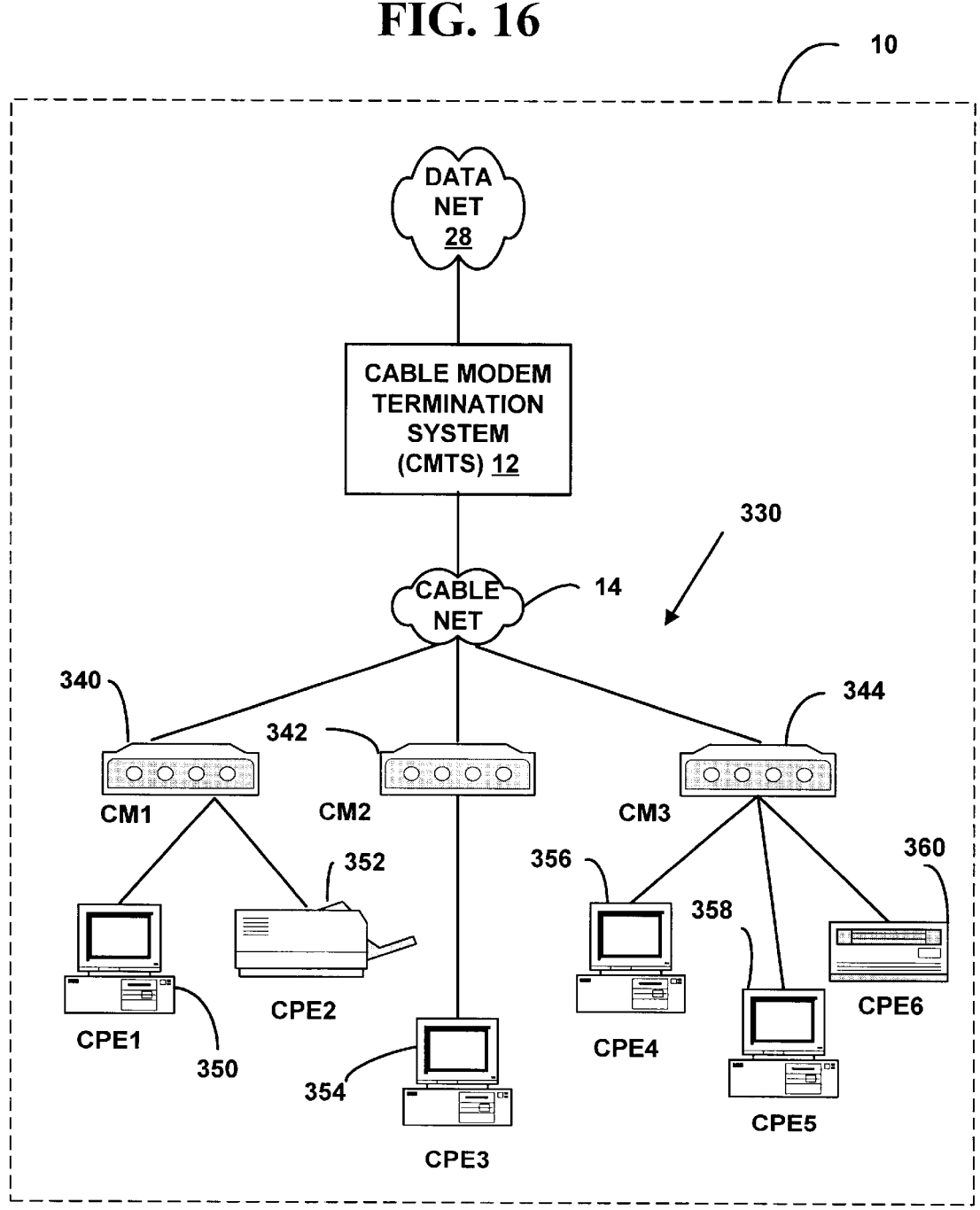
FIG. 16 is a block diagram illustrating a configuration of network devices.

Examples of a CMTS 12 ARP table and CM 16 ARP tables can be made with reference to FIG. 16. FIG. 16 illustrates an exemplary configuration 330 of cable modems and customer premise equipment. In this exemplary configuration, cable modems CM1 340, CM2 342, and CM3 344 are connected to the CMTS 12 via the cable net 14. Customer premise equipment CPE1 350 and CPE2 352 are connected to CM1 340. Customer premise equipment CPE3 354 is connected to CM2 342. Customer premise equipment CPE4 356, CPE5 358, and CPE6 360 are connected to CM3 344. Examples of the IP 54 and MAC 44 addresses of each piece of these network devices are presented in Table 10.

TABLE 10

| Network device | IP 54 address | MAC 44 address |
|---|---|---|
| CM1 340 | 217.164.193.87 | 00:b1:40:d3:10:32 |
| CM2 342 | 217.164.192.126 | 00:b1:42:f2:11:02 |
| CM3 344 | 217.164.192.39 | 00:b1:44:a2:10:03 |
| CPE1 350 | 217.164.194.91 | 00:c0:50:4c:29:17 |
| CPE2 352 | 217.164.194.90 | 00:40:2c:03:98:05 |
| CPE3 354 | 217.164.193.203 | 00:c0:7b:6e:11:5b |
| CPE4 356 | 217.164.193.73 | 00:c0:b9:34:29:8c |
| CPE5 358 | 217.164.194.145 | 00:c0:ea:14:9f:23 |
| CPE6 360 | 217.164.193.23 | 00:40:3:58:e7:aa |

The IP 54 addresses for the network devices are obtained from a DHCP 66 server on a selected network host interface as described in Methods 140, 188, 240, and 294. The MAC 44 addresses for the cable modems and customer premise equipment are physical addresses and are unique to hardware on each network device.

The entries in the cable modem ARP tables are the IP 54 addresses of the customer premise equipment paired with the MAC 44 address of that piece of customer premise equipment. An ARP table associated with CM1 340 could have two entries as shown in Table 11a.

TABLE 11a

| IP 54 address | MAC 44 address |
|---|---|
| 217.164.194.91 | 00:c0:50:4c:29:17 |
| 217.164.194.90 | 00:40:2c:03:98:05 |

These entries are the IP 54/MAC 44 address pairs for CPE1 350 and CPE2 352 respectively. The entries, however, need not be in this particular order and need not be stored is a two-by-two tabular form as depicted in Table 11a. Other orderings of the pairs and ways of associating each member of the pair may be possible. Similarly, an ARP table associated with CM2 342 could have a single entry as shown in Table 11b.

TABLE 11b

| IP 54 address | MAC 44 address |
|---|---|
| 217.164.193.203 | 00:c0:7b:6e:11.5b |

This entry is the IP 54/MAC 44 address pair for CPE3 354. Additionally, in this example, an ARP table associated with CM3 344 could have three entries as shown in Table 11c.

TABLE 11c

| IP 54 address | MAC 44 address |
|---|---|
| 217.164.193.73 | 00:c0:b9:34:29:8c |
| 217.164.194.14 | 00:c0:ea:14:9f:23 |
| 217.164.193.23 | 00:40:3:58:e7:aa |

The entries in Table 11c are the IP 54/MAC 44 address pairs for CPE4 356, CPE5 358, and CPE6 360 respectively. The entries, however, need not be in this particular order and need not be stored is a three-by-two tabular form as depicted in Table 11c. Other orderings of the pairs and ways of associating each member of the pair may be possible.

The entries in the CMTS 12 ARP table are the IP 54/MAC 44 address pairs of the cable modems and additionally the IP 54 address of each CPE paired with the MAC 44 address of the cable modem to which it is attached. A CMTS 12 ARP table for this example configuration 330 is presented in Table 12.

TABLE 12

| IP 54 address | MAC 44 address |
| --- | --- |
| 217.164.193.87 | 00:b1:40:d3:10:32 |
| 217.164.192.126 | 00:b1:42:f2:11:02 |
| 217.164.192.39 | 00:b1:44:a2:10:03 |
| 217.164.194.91 | 00:b1:40:d3:10:32 |
| 217.164.194.90 | 00:b1:40:d3:10:32 |
| 217.164.193.203 | 00:b1:42:f2:11:02 |
| 217.164.193.73 | 00:b1:44:a2:10:03 |
| 217.164.194.145 | 00:b1:44:a2:10:03 |
| 217.164.193.23 | 00:b1:44:a2:10:03 |

The CMTS 12 ARP table entries are presented as IP 54/MAC 44 pairs in the order CM1 340, CM2 342, CM3 344, CPE1 350, CPE2 352, CPE3 354, CPE4 356, CPE5 358, and CPE6 360 respectively. The entries, however, need not be in this particular order and need not be stored is a nine-by-two tabular form as depicted in Table 12. Other orderings of the pairs and ways of associating each member of the pair may be possible. As depicted in Table 12, the IP 54 addresses for CM1 340, CPE1 350, and CPE2 352 resolve to the MAC 44 address for CM1 340. The IP 54 addresses for CM2 342 and CPE3 354 resolve to the MAC 44 address for CM2 342. The IP 54 addresses for CM3 344, CPE4 356, CPE5 358, and CPE6 360 resolve to the MAC 44 address for CM3 344.

Cable Modem Registration

After Methods 140 and 188 of FIGS. 6 and 10, the CMTS 12 has a valid IP/MAC address pair in one or more address routing tables, including an ARP table, to forward IP 54 data packets from the data network 28 to the CM 16. The methods have created a virtual IP 54 data path to/from the CM 16 for the transmission of data via the process illustrated in Table 3. The CM 16 has the necessary parameters to proceed to the next phase of initialization, a download of a configuration file via TFTP 64. The configuration file is transmitted from the CMTS 12 to the CM 16 by TFTP 64. TFTP 64 is a file transfer protocol that requires the existence of an IP 54 path such as that previously established to/from the CM 16. The file is transferred over the cable net 14.

Once the CM 16 has received the configuration file and has been initialized, it registers with the CMTS 12 and is ready to receive data from the data network 14. The CM 16 creates a registration request message ("REG-REQ") and transmits it to the CMTS 12 via the TRAC 24 and the PSTN 22. In another embodiment of the present invention, the registration request message is sent from the CM 16 to the CMTS 12 via the cable network 14 on an upstream cable television connection.

Figure 17:
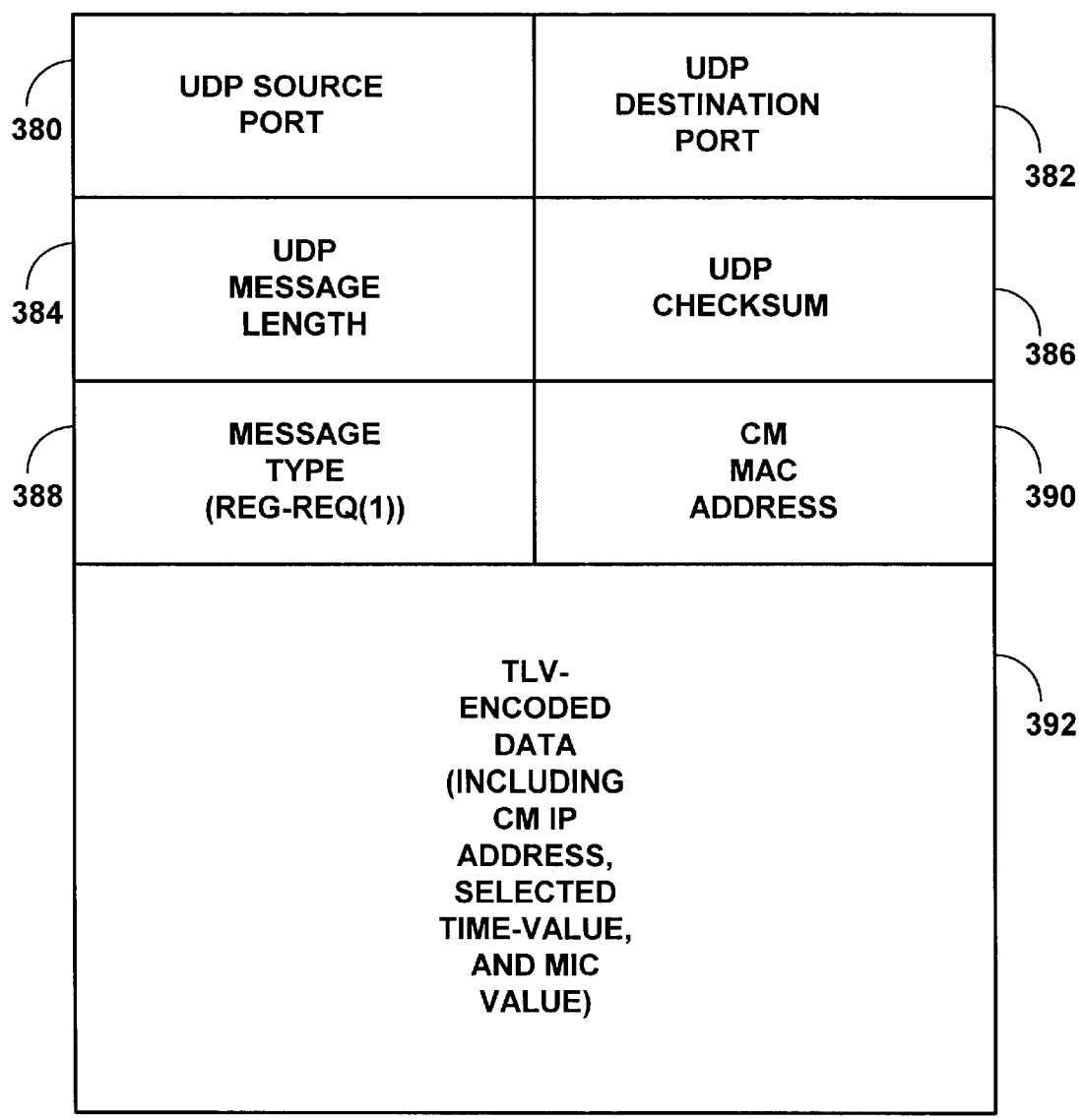
FIG. 17 is a block diagram illustrating a cable modem registration request message.

The form of the registration request message is shown in FIG. 17. The cable modem registration request message 378 includes a UDP 60 source port field 380, a UDP 60 destination port field 382, a UDP 60 message length field 384, UDP 60 check sum field 386, a message type field 388 (1=registration request, 2=registration response), a CM 16 MAC 44 address field 390 and TLV encoded data field 392 with configuration parameters including a message integrity check ("MIC") value. The CMTS 12 responds with a registration response message ("REG-RSP") authorizing the CM 16 to transmit data over the data network 28.

A CPE 18 may also undergo a registration procedure when establishing a connection to a data network 28. After Methods 240 and 294 of FIGS. 12 and 14, the CMTS 12 and the CM 16 have valid IP/MAC address pairs in one or more address routing tables including an ARP table to forward IP 54 data packets from the data network 28 to the CPE 18. The methods have created a virtual IP 54 data path to/from the CPE 18. The CM 16 or CMTS 12 then may send a configuration file to the CPE 18. The CPE 18 may then send a registration message to the CM 16 seeking authorization to connect to the data network 28 through the CM 16. This CPE registration message may be a message on the data link layer 42 such as on a bus or RS232 connection between the CM 16 and the CPE 18. In another embodiment of the present invention, the CM 16 informs the CMTS 12 that it has received the registration message from the CPE 18. The CMTS 12 or CM 16 may respond with a registration response message authorizing the CPE 18 to transmit data over the data network 28.

The CM16 must update routing and ARP tables at Step 320 of FIGS. 14B and 15. The CMTS 12 must update routing and ARP tables at Step 208 of FIGS. 10B and 11, and at Step 316 of FIGS. 14B and 15. Network address tables, such as ARP tables, comprise pairs of addresses and allow conversion from one type of protocol to another as a data packet is passed through network layers such as those depicted in FIG. 2. Both the CMTS 12 and each CM 16 have ARP tables for passing packets from the network layer 52 to the data link layer 42. The ARP table in the CMTS 12 comprises IP/MAC pairs of the IP 54 address for each CM 16 and the MAC 44 layer address for the CM 16, and additionally IP/MAC pairs of the IP 54 address for each CPE 18 and the MAC 44 layer address for the CM 16 to which the CPE 18 is attached. The ARP table in the CM 16 comprises IP/MAC pairs of the IP 54 address for each CPE 18 attached to that particular CM 16 and the MAC 44 layer address for that CPE 18.

An IP/MAC pair entry is created in an ARP table at Steps 208, 316, or 320 when a DHCPACK message intended for a CM 16 or a CPE 18 is forwarded by the CMTS 12 or CM 16. An IP/MAC pair can be deleted from an ARP table by an explicit command or by an ARP cache timeout. An ARP cache timeout can occur if there have been no messages sent to or received from an IP/MAC address within a particular time. An ARP cache timeout could also occur if the ARP protocol generates an ARP request message for each MAC address in the ARP table and deletes those entries from which there is no ARP reply message within a specified time. However, in both cases the time would have to be sufficiently long to prevent deletion of network devices that are still present on the network but are merely in a quiescent state. Timeout values of ten or twenty minutes are common and familiar to those skilled in the art.

A table entry can become stale if a CM 16 or CPE 18 is removed from the data-over-cable system and the removal does not explicitly delete the respective entry from the ARP tables. The entry can linger in the tables until purged by the ARP cache timeout. Removal of a CM 16 or CPE 18 can occur at the direction of a user or may occur by failure of the network device or a data communications error. Removal of a CM 16 or CPE 18 can also occur during the initialization stage of the network device and can render the data-over-cable system vulnerable to a security breach and unauthorized access by a rogue user. If a cable modem or customer premise equipment fails to register properly the ARP tables nonetheless retain the invalid entries for that network device until the ARP cache timeout. A rogue user can adopt these invalid entries thus breaching the security of the data-over-cable system 10.

Internet Control Message Protocol

The Internet Control Message Protocol ("ICMP") layer 56 (FIG. 2) is used for network management. The main functions of the ICMP 56 layer include error reporting, reachability testing (e.g., "pinging") congestion control, route-change notification, performance, subnet addressing and others. Since the IP 54 is an unacknowledged protocol, datagrams may be discarded and the ICMP 56 is used for error reporting. ICMP 56 messages are IP 54 datagrams with a standard IP 54 header. As is well known in the art, an IP 54 header contains the IP 54 addresses of the source and destination network devices. For more information on the ICMP 56 see RFC-792 incorporated herein by reference.

The ICMP 56 messages typically report errors in the processing of IP 54 datagrams. ICMP 56 messages may also be used to detect whether a particular IP 54 address exists and if it can accept IP 54 datagrams. ICMP 56 messages that detect whether a particular IP 54 address is active are typically termed ICMP echo and ICMP echo reply messages. An ICMP echo message is a message sent from a source network device to a destination IP 54 address on the data network. If there exists a destination network device with that IP 54 address the destination network device will receive the ICMP echo message. The destination network device responds by sending an ICMP echo reply message back to the source network device.

ICMP 56 echo messages may be generated from a PING utility running on the source network device. PING is more fully described in RFC-2151 which is incorporated herein by reference. An ICMP 56 message is sent to the designated destination IP 54 address and the PING utility waits for a response in the form of an ICMP 56 echo reply message. A typical PING utility can take parameters and can output results. One of the inputs may be a destination IP 54 address of a destination network device whose existence or activity is under scrutiny. Also, the output of the PING utility may include a response time e.g. the value of the round-trip delay time, as measured by the source network device, between sending the ICMP 56 echo message and receiving the ICMP 56 echo reply message. The output of the PING utility may also be a message indicating that an ICMP 56 echo request timed out when the utility detected no ICMP 56 echo reply message within a certain time. Once launched, the PING utility may return a response time or a timeout message.

Figure 18:
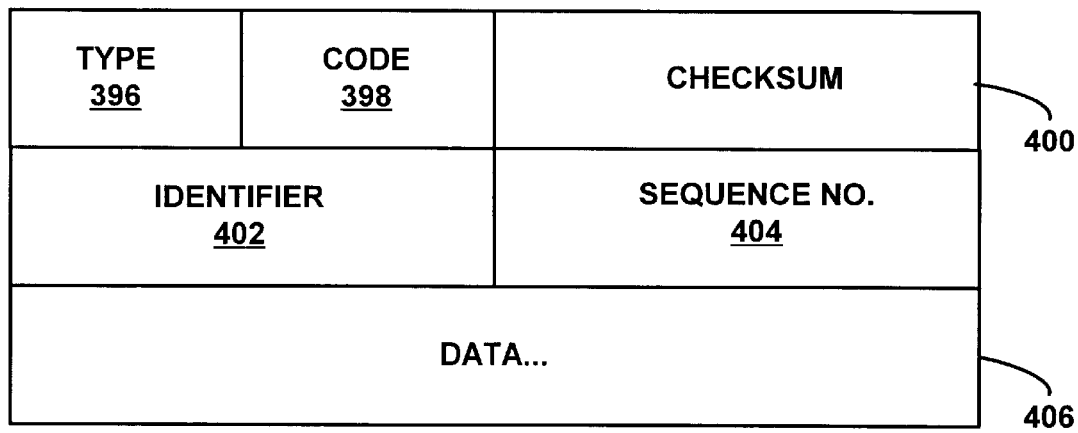
FIG. 18 is a block diagram illustrating an Internet Control Message Protocol message structure.

FIG. 18 illustrates the message structure of an ICMP 56 echo message or an ICMP 56 echo reply message. Message 394 comprises a type field 396, a code field 398, a checksum field 400, an identifier field 402, a sequence field 404, and a data field 406. An ICMP 56 echo message has a standard IP 54 header (not shown in FIG. 18) with the source address set as the IP 54 address of the network device generating the ICMP 56 message and the destination address set as the IP 54 address of the network device to be requested for a response. The header of the ICMP 56 echo reply message sent in response simply reverses the source and destination addresses from the ICMP 56 echo message.

The fields for ICMP 56 echo and echo reply messages may have the values depicted in Table 13.

TABLE 13

| ICMP 56 Fields 394 | Description |
| --- | --- |
| Type 396 | This field is set to 8 for an echo message or zero for an echo reply message. |
| Code 398 | This field is set to zero |
| Checksum 400 | The checksum field is the 16-bit one's complement of the one's complement sum of the ICMP message starting with the ICMP Type. For computing |

TABLE 13-continued

| ICMP 56 Fields 394 | Description |
| --- | --- |
| | the checksum, the checksum field should be zero. If the total length is odd, the received data is padded with one octet of zeros for computing the checksum. |
| Identifier 402 | If the code field = 0, an identifier to aid in matching echoes and echo replies. May be zero. |
| Sequence Number 404 | If the code field = 0, a sequence number to aid in matching echoes and echo replies. May be zero. |
| Data 406 | The data received in the echo message must be returned in the echo reply message. |

Network Address Table Maintenance

Figure 19:
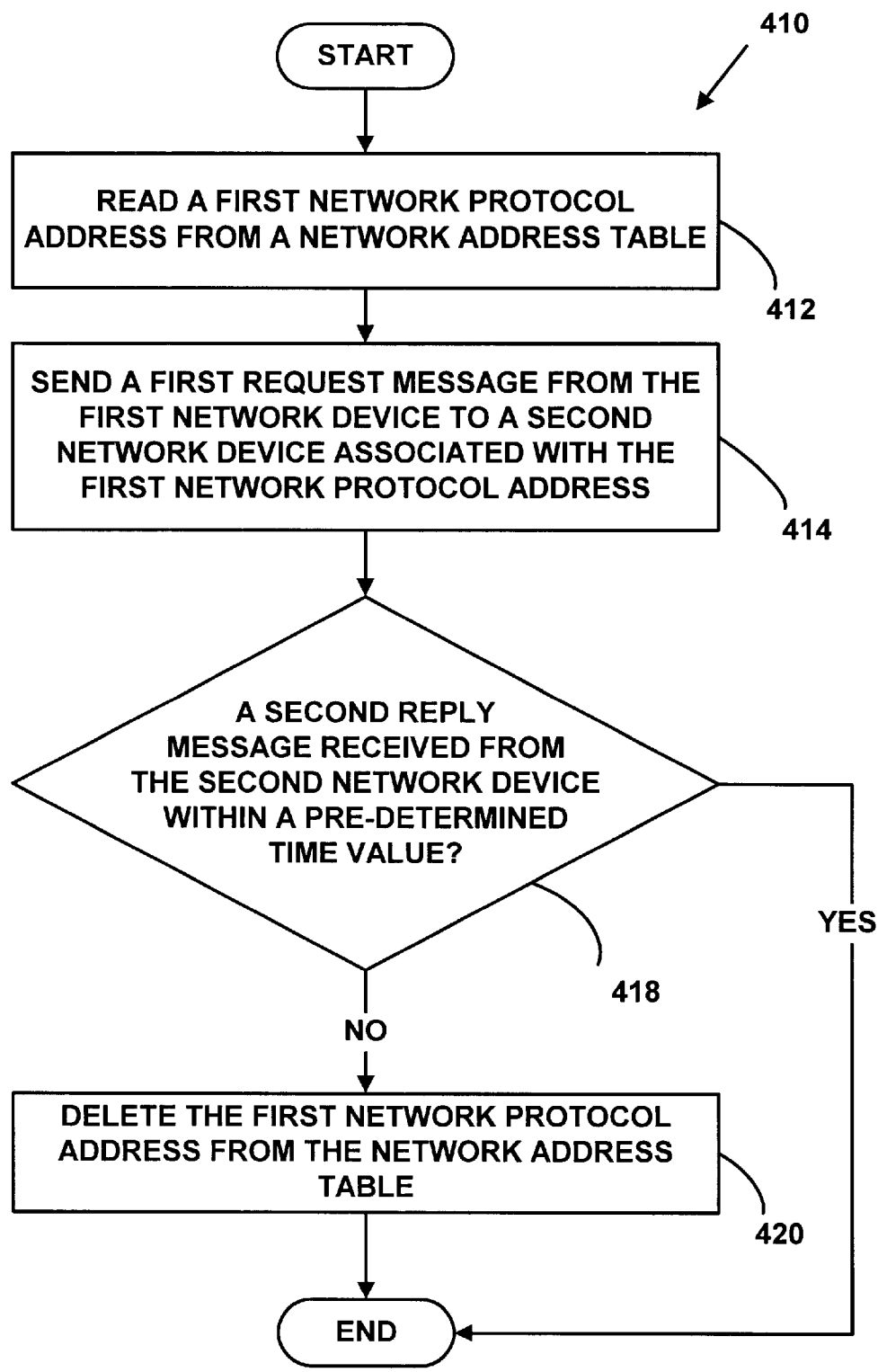
FIG. 19 is a flow diagram illustrating a method for network address table maintenance.

FIG. 19 is a flow diagram illustrating a Method 410 for network address table maintenance in a data-over-cable system. Method 410 includes reading a first network protocol address, for a protocol other than a data link layer protocol, from a network address table associated with a first network device at Step 412. A first request message is sent from the first network device to a second network device associated with the first network protocol address at Step 414. The first request message is sent to determine if the second network device is active. A determination is made as to whether the first network device receives a second reply message from the second network device within a pre-determined amount of time at Step 418. If not, the first network protocol address is deleted from the network address table at Step 420.

The protocol is other than a data link layer protocol. As is known in the art, the Open System Interconnection model used to describe computer networks consists of seven layers including from lowest-to-highest, a physical, data-link, network, transport, session, application and presentation layer. The physical layer transmits bits over a communication link. The data link layer transmits error free frames of data. The network layer transmits and routes data packets. An example of a data link protocol is a MAC 44 protocol.

In one exemplary preferred embodiment of the present invention, the first network device is a CMTS 12, the second network device is a CM 16, the network address table is a CMTS 12 ARP table. The first request message and the second reply message are network management messages. The first network protocol address is an IP 54 address for the CM 16. In another exemplary preferred embodiment, the first request message is an ICMP 56 echo message to the CM 16 and the second reply message is an ICMP 56 echo reply message to the CMTS 12. In yet another exemplary preferred embodiment the pre-determined time value is a time value other than a network address table cache timeout value. However, the present invention is not limited to these embodiments and other network devices, messages, and addresses could also be used for network address table management.

Exemplary Network Address Table Maintenance for a CMTS

Figure 20:
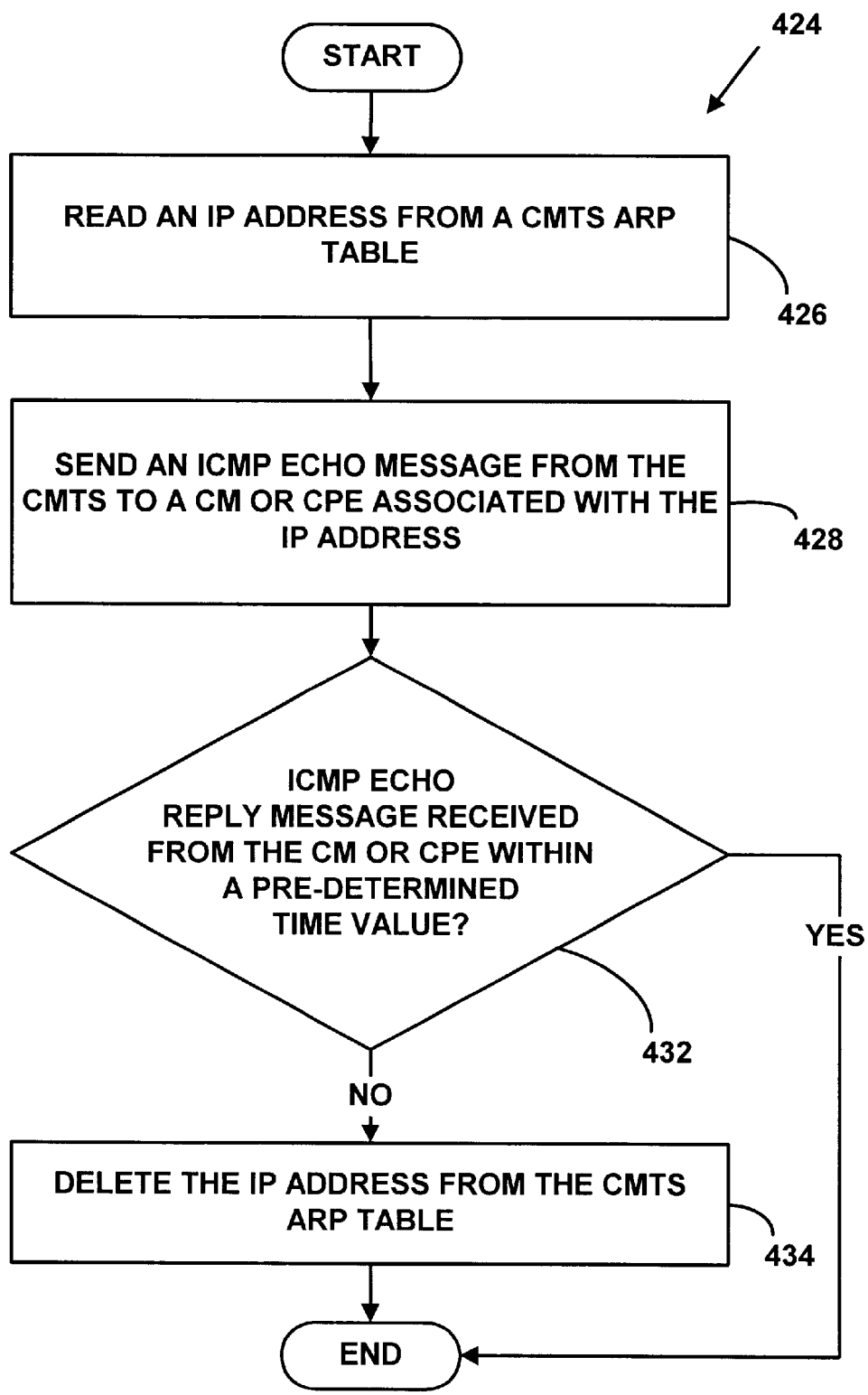
FIG. 20 is a flow diagram illustrating a method for maintenance of a cable modem termination system's network address table.

FIG. 20 is a flow diagram illustrating a Method 424 for the management of cable modem or customer premise equipment entries in a CMTS 12 ARP table. The CM 16 entries may arise at Step 208 of Method 188 (FIGS. 10A and 11) for establishing a virtual connection between the CM 16 and the data network 28. Similarly, the CPE 18 entries may arise at Step 316 of Method 294 (FIGS. 14A and 15) for establishing a virtual connection between the CPE 18 and the data network 28. The ARP table entry for a CM 16 is the IP 54 address for that CM 16 paired with the MAC 44 address for the CM 16 whereas the entry for a CPE 18 is the IP 54 address for the CPE 18 paired with the MAC 44 address of the CM 16 to which that CPE 18 is attached.

In one exemplary preferred embodiment, the IP 54 address is read from an entry in the CMTS 12 ARP table at Step 426. An ICMP 56 echo message is created with the IP 54 address of the entry set as the destination address in the IP 54 header and the IP 54 address of the CMTS 12 set as the source address in the IP 54 header. The CMTS 12 sends the ICMP 56 echo message to the CM 16 or CPE 18 purportedly having the valid and active IP 54 destination address at Step 428. The ICMP 56 echo message is sent downstream on the cable net 14. At Step 432, the CMTS 12 determines if it receives an ICMP 56 echo reply message from the destination IP 54 address within a pre-determined amount of time after sending the original ICMP 56 echo message. The pre-determined time value is a time value other than those values typically associated with an IP 54 address in the ARP table. The pre-determined time value may be chosen to effectuate a rapid flushing of stale entries in the CMTS 12 ARP table. In one exemplary preferred embodiment the selection of a pre-determined time value smaller than a typical ARP cache timeout value may result in the deletion of a CMTS 12 ARP table entry outside typical ARP table maintenance. If there has been no ICMP 56 echo reply from the destination IP 54 address within the pre-determined amount of time the CMTS 12 deletes the IP 54 address from the CMTS 12 ARP table at Step 434.

In another exemplary preferred embodiment of the present invention, an ICMP 56 echo reply message is sent from a CM 16 to the CMTS 12 via the TRAC 24 and the PSTN 22 on an upstream telephony channel. In yet another exemplary preferred embodiment of the present invention, the ICMP 56 echo reply message is sent from a CM 16 to the CMTS 12 via the cable network 14 on an upstream cable television connection. Method 424 may result in a rapid removal of stale and potentially insecure ARP table entries for network devices such as cable modems or customer premise equipment.

As is illustrated in Tables 10 to 12, the CMTS 12 ARP table contains IP 54 addresses paired with MAC 44 addresses. Deletion of the IP 54 address for a CM 16 or a CPE 18 at Step 434 also deletes a MAC 44 address for a CM 16 paired with the IP 54 address. Failure to receive an ICMP 56 echo reply message may occur when the CM 16 or CPE 18 has terminated a connection. Termination could be the result of the conclusion of a session between the CPE 18 and the network (e.g. the user logs off), or by the accidental or intentional power-down of any of the pieces of networking equipment. Failure to receive an ICMP 56 echo reply message may also occur as a result of a security breach in the data-over-cable system or as a result of a failure of the CM 16 or CPE 18 to register properly with the data-over-cable system.

One exemplary preferred embodiment of the present invention provides improved ARP table maintenance. Should a network device such as a CM 16 or CPE 18 fail to reply within the pre-determined time value, the deletion of the network device IP 54 address from the CMTS 12 ARP table ensures that the network device cannot communicate with the data network 28. Additionally, the deletion of the IP 54 address for the network device prevents further use of an IP/MAC pairing. Entries that have become stale due to the termination of a connection between the CM 16 or CPE 18 and the data network 28 or CMTS 12 may be efficiently and rapidly flushed. The CM 16 or CPE 18 is isolated from the data network 28 and may be prevented from further communication.

Another exemplary preferred embodiment provides increased security to the data-over-cable network. A rogue user may breach security in a data-over-cable system by adopting addresses of a stale entry in the CMTS 12 ARP table before it is deleted by a cache timeout. A selection of the pre-determined time value for receiving an ICMP 56 echo reply message may hasten the deletion of stale entries and may frustrate the attempts of a rogue user to adopt the stale addresses. A rogue user could not then take advantage of a failure of a CM 16 or CPE 18 to register with the CMTS 12 or adopt the addresses of a recently terminated connection. Additionally, a failure to register or a termination of a connection may be the result of a deliberate attempt of a rogue user to circumvent security. In this manner, any failure, termination, or delay in registration prevents a CM 16 or CPE 18 from communicating with the data network 28.

Exemplary Network Address Table Maintenance for a Cable Modem

In yet another exemplary preferred embodiment of the present invention, the first network device is a CM 16, the second network device is a CPE 18, the network address table is a CM 16 ARP table. The first request message is an ICMP 56 echo message to the CPE 18. The first network protocol address is an IP 54 address for the CPE 18 and the second reply message is an ICMP 56 echo reply message. However, the present invention is not limited to this embodiment and other network devices, messages, and addresses could also be used for network address table management.

Figure 21:
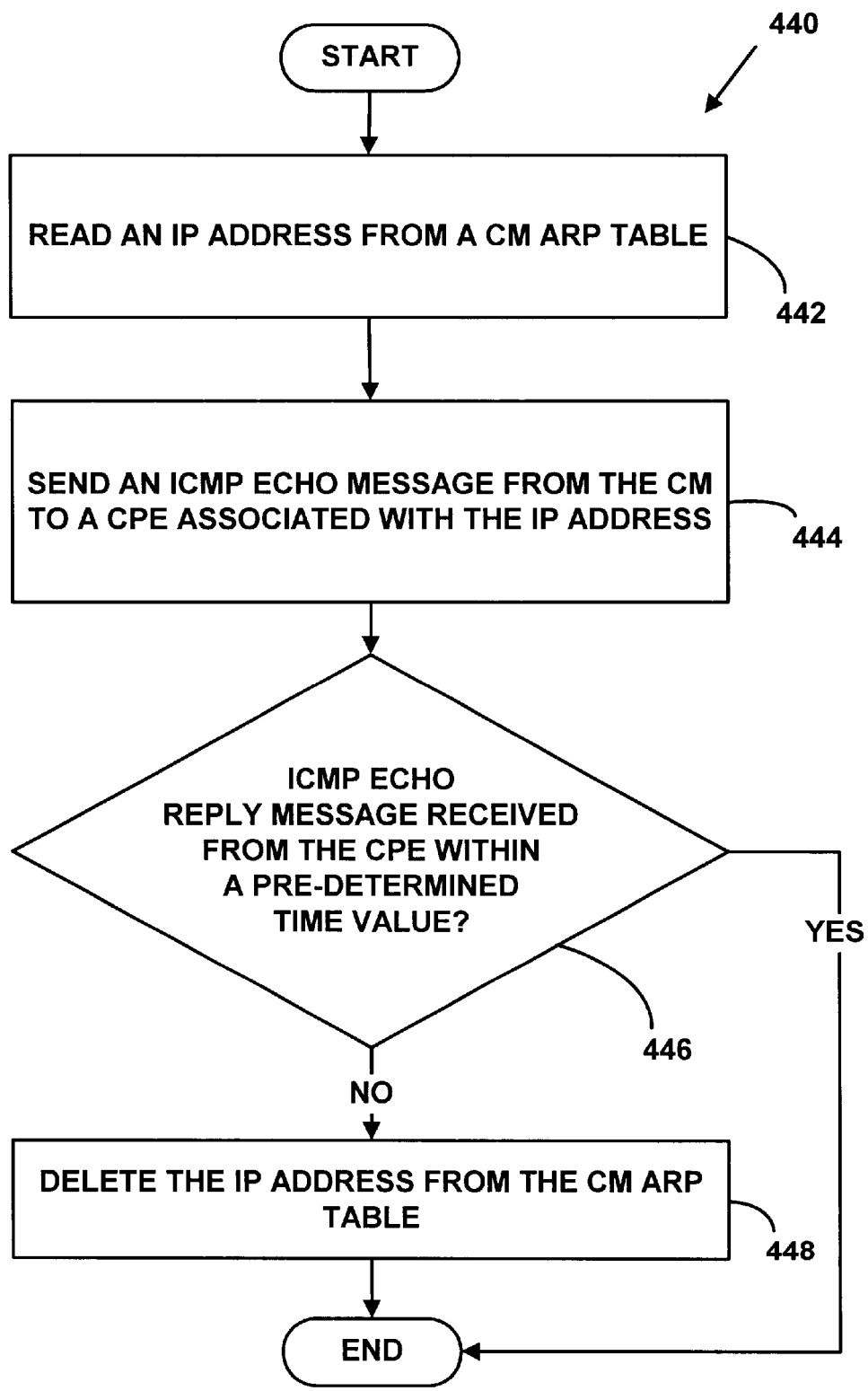
FIG. 21 is a flow diagram illustrating a method for maintenance of a cable modem's network address table.

FIG. 21 is a flow diagram illustrating a Method 440 for the management of customer premise equipment entries in a CM 16 ARP table. The CPE 18 entries may arise at Step 320 of Method 294 (FIGS. 14A and 15) for establishing a virtual connection between the CPE 18 and the data network 28. The ARP table entry for a CPE 18 is the IP 54 address for the CPE 18 paired with the MAC 44 address of the CPE 18.

In one exemplary preferred embodiment, the IP 54 address is read from an entry in the CM 16 ARP table at Step 442. An ICMP 56 echo message is created with the IP 54 address of the entry set as the destination address in the IP 54 header and the IP 54 address of the CM 16 set as the source address in the IP 54 header. The CM 16 sends the ICMP 56 echo message to the CPE 18 purportedly having the valid and active IP 54 destination address at Step 444. At Step 446, the CM 16 determines if it receives an ICMP 56 echo reply message from the destination IP 54 address within a pre-determined amount of time after sending the original ICMP 56 echo message. The pre-determined time value is a time value other than those values typically associated with an IP 54 address in the ARP table. The predetermined time value may be chosen to effectuate a rapid flushing of stale entries in the CM 16 ARP table. In one exemplary preferred embodiment the selection of a pre-determined time value smaller than a typical ARP cache timeout value may result in the deletion of a CM 16 ARP table entry outside typical ARP table maintenance. If there has been no ICMP 56 echo reply from the destination IP 54 address within the predetermined amount of time the CM 16 deletes the IP 54 address from the CM 16 ARP table at Step 448.

As is illustrated in Tables 10 to 12, the CM 16 ARP table contains IP 54 addresses paired with MAC 44 addresses. Deletion of the IP 54 address for a CPE 18 at Step 448 also deletes a MAC 44 address for a CPE 18 paired with the IP 54 address. Method 440 may result in a rapid removal of stale and potentially insecure entries for customer premise equipment in a cable modem ARP table.

Exemplary Network Address Table Maintenance for Multiple Addresses

In another exemplary preferred embodiment of the present invention, the deleting Step 420 (FIG. 19) further comprises deleting at least one second network protocol address associated with the first network protocol address. The first and second network protocol addresses can be IP 54 addresses. For example, deletion of an IP 54 address for a CM 16 in the CMTS 12 ARP table at Step 434 (FIG. 20) could cause the deletion of the IP 54 addresses for all CPEs 18 having the CM 16 as their gateway. Also, for example, deletion of an IP 54 address for a CPE 18 in the CMTS 12 ARP table at Step 434 could cause the deletion of the IP 54 address for the CM 16 to which it is attached, and the deletion of the IP 54 addresses for all CPEs 18 having this CM 16 as their gateway.

Alternately, the second network protocol address could be a MAC 44 address. For example, deletion of an IP 54 address for a CM 16 in the CMTS 12 ARP table at Step 434 could cause the deletion of the MAC 44 addresses for the CPEs 18 in one or both of the CMTS 12 or CM 16 ARP tables. Many other choices for the first and second network protocol addresses are possible and it should be understood that the present invention is not limited by a choice of network protocol addresses.

Exemplary Network Address Table Maintenance Upon Receiving a Reply Message

In yet another exemplary preferred embodiment of the present invention, the determining Step 418 (FIG. 19) includes determining whether the second message is received within the pre-determined amount of time. If so, the first network protocol address is not deleted from the network address table. For example, if the time between sending the ICMP 56 echo message and receiving an ICMP 56 echo reply message is less than the pre-determined amount of time the CM 16 or CPE 18 is deemed to be active and legitimately communicating with the data network 28. The network devices may be deemed to have successfully and securely registered, not failed, and not terminated their connections with the data network 28. The IP 54 address for the CM 16 or CPE 18 is valid and the network device is permitted to communicate with the data network 28. The IP/MAC pair for the CM 16 or CPE 18 should remain in the CMTS 12 or CM 16 ARP table to allow the transmission of IP 54 datagrams to/from the data network 28 and the network device.

Exemplary Network Address Table Maintenance Using a PING Utility

Figure 22:
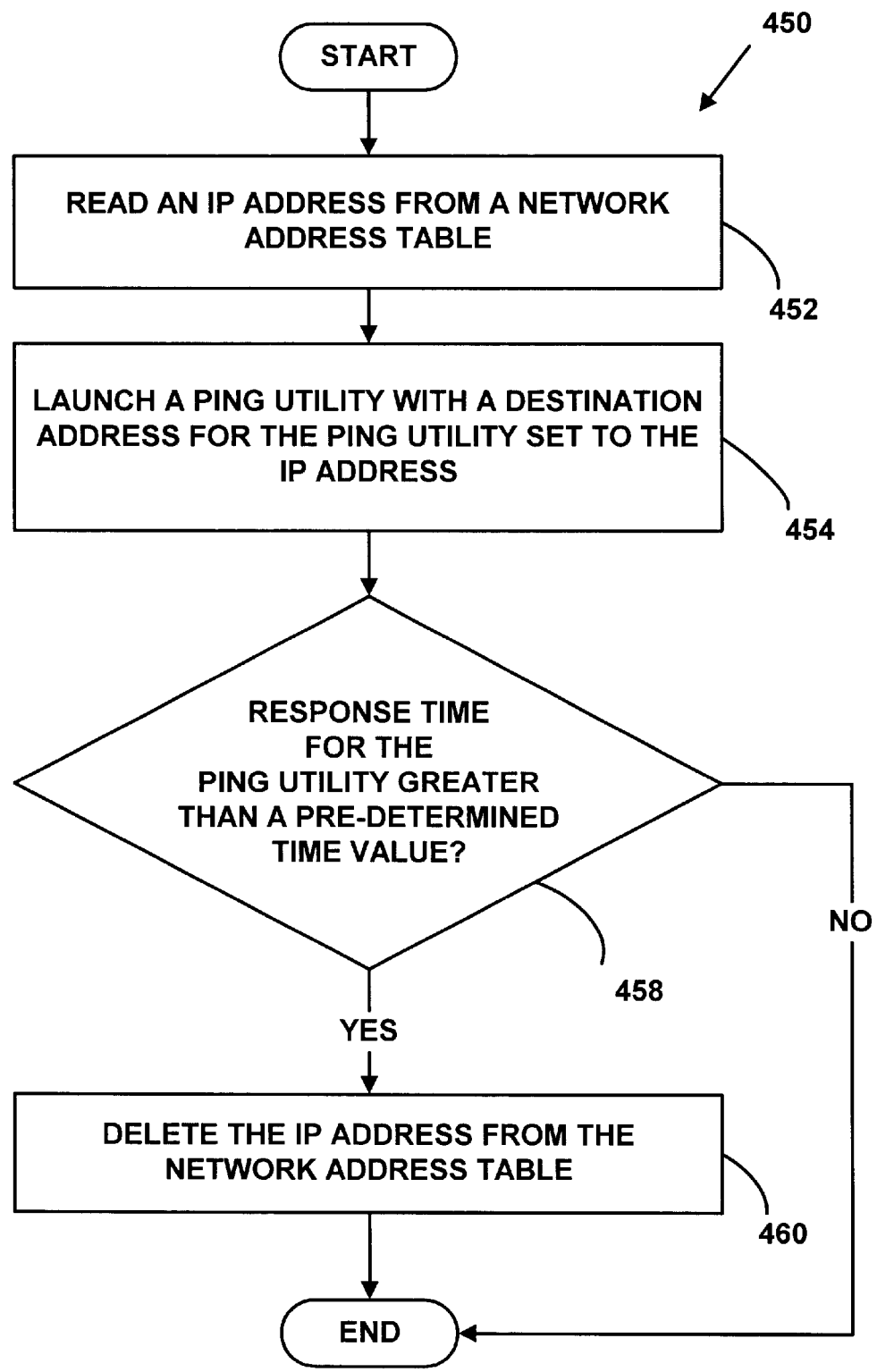
FIG. 22 is a flow diagram illustrating a method for network address table maintenance.

FIG. 22 is a flow diagram illustrating a Method 450 for network address table maintenance in a data-over-cable system. Method 450 includes reading an Internet Protocol address from a network address table associated with a network device at Step 452. A PING utility is launched on the network device at Step 454. The PING utility was described above in the section on Internet Control Message Protocol. The PING utility has an input adapted for receiving a destination address and an output adapted for returning a response time. The destination address is set to the Internet Protocol address. A determination is made as to whether the response time for the PING utility is less than a pre-determined amount of time at Step 458. If not, the Internet Protocol address is deleted from the network address table at Step 460. The response time returned by the PING utility may be a time value output from the PING utility or may be an message from the PING utility indicating that an ICMP echo request timed out. The pre-determined amount of time is less than a network address table cache timeout period. In one exemplary preferred embodiment of the present invention the network address table is an ARP table, although it should be understood that the invention encompasses any network address table for resolving network addresses. In other exemplary preferred embodiments, the network device is a CMTS 12 or a CM 16.

In yet another exemplary preferred embodiment, the CMTS 12 or CM 16 reads an IP 54 address from the CMTS 12 ARP table or the CM 16 ARP table. This IP 54 address is used as a destination address input when launching a PING utility on the network device. The PING utility sends an ICMP 56 echo message to the IP 54 address. The PING utility monitors the ICMP 56 layer and determines if an ICMP 56 echo reply message has returned from the IP 54 address. If an ICMP 56 echo reply message has been received the PING utility determines the round-trip delay time for the transmission of the ICMP 56 echo and the receipt of the ICMP 56 echo reply.

The PING utility outputs the round-trip delay time as a response time. If this response time is greater than a pre-determined amount of time the IP 54 address is deleted from the network address table. Additionally, if the PING utility outputs a timeout message, indicating an excessive response time, the IP 54 address is deleted from the network address table. In a data-over-cable system a large response time or timeout may be due to the termination of a connection to the data network 28 or due to a breach of security. Method 450 may result in the rapid removal of stale and potentially insecure network address table entries for network devices such as cable modems or customer premise equipment.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a data-over-cable system, a method of network address maintenance, comprising the steps of:

reading a first network protocol address, for a protocol other than a data link layer protocol, from a network address table associated with a first network device;

sending a first request message from the first network device to a second network device associated with the first network protocol address to determine if the second network device is active; and determining whether the first network device receives a second reply message from the second network device within a pre-determined amount of time, and if not, deleting the first network protocol address from the network address table.

2. A computer readable medium having stored therein instructions for causing a central processing unit to execute the method of claim 1.

3. The method of claim 1 wherein the first request message and the second reply message are network management messages.

4. The method of claim 1 wherein the first request message is an Internet Control Message Protocol echo message.

5. The method of claim 1 wherein the second reply message is an Internet Control Message Protocol echo reply message.

6. The method of claim 1 wherein the first network protocol address is an Internet Protocol address.

7. The method of claim 1 wherein the network address table is an Address Resolution Protocol table.

8. The method of claim 1 further comprising:
determining whether the first network device receives the second reply message from the second network device, and if so,
not deleting the first network protocol address from the network address table.

9. The method of claim 1 wherein the first network device is a cable modem termination system and the second network device is a cable modem.

10. The method of claim 1 wherein the first network device is a cable modem termination system and the second network device is customer premise equipment.

11. The method of claim 1 wherein the first network device is a cable modem and the second network device is customer premise equipment.

12. The method of claim 1 wherein the deleting step further comprises deleting at least one second network protocol address associated with the first network protocol address.

13. The method of claim 12 wherein the second network protocol address is any of an Internet Protocol address or a Medium Access Control address.

14. In a data-over-cable system, a method of network address maintenance, comprising the steps of:
reading an Internet Protocol address from a network address table associated with a network device;
launching a PING utility on the network device, the PING utility having an input adapted for receiving a destination address and an output adapted for returning a response time, and wherein the destination address is set to the Internet Protocol address;
determining whether the response time for the PING utility is greater than a pre-determined amount of time, and if so,
deleting the Internet Protocol address from the network address table, wherein the pre-determined amount of time is less than a network address table cache timeout period.

15. A computer readable medium having stored therein instructions for causing a central processing unit to execute the method of claim 14.

16. The method of claim 14 wherein the network address table is an Address Resolution Protocol table.

17. The method of claim 14 wherein the network device is a cable modem termination system.

18. The method of claim 14 wherein the network device is a cable modem.

19. In a data-over-cable system, a method of network address maintenance, comprising the steps of:
reading an Internet Protocol address from an Address Resolution Protocol table associated with a cable modem termination system;
sending an Internet Control Message Protocol echo message from the cable modem termination system to a network device associated with the Internet Protocol address; and
determining whether the cable modem termination system receives an Internet Control Message Protocol echo return message from the network device within a pre-determined time value, and if not,
deleting the Internet Protocol address from the Address Resolution Protocol table.

20. A computer readable medium having stored therein instructions for causing a central processing unit to execute the method of claim 19.

21. The method of claim 19 wherein the network device is a cable modem.

22. The method of claim 19 wherein the network device is customer premise equipment.

23. In a data-over-cable system, a method of network address maintenance, comprising the steps of:
reading an Internet Protocol address from an Address Resolution Protocol table associated with a cable modem;
sending an Internet Control Message Protocol echo message from the cable modem to customer premise equipment associated with the Internet Protocol address; and
determining whether the cable modem receives an Internet Control Message Protocol echo return message from the customer premise equipment within a pre-determined time value, and if not,
deleting the Internet Protocol address from the Address Resolution Protocol table.

24. A computer readable medium having stored therein instructions for causing a central processing unit to execute the method of claim 23.

* * * * *

UNITED STATES PATENT AND TRADEMARK OFFICE
CERTIFICATE OF CORRECTION

PATENT NO. : 6,754,622 B1
DATED : June 22, 2004
INVENTOR(S) : Nurettin B. Beser and John G. Fijolek It is certified that error appears in the above-identified patent and that said Letters Patent is hereby corrected as shown below:

Title page,
Item [54], Title, please delete "REACHIBILITY" and substitute
-- REACHABILITY --

Signed and Sealed this

Eleventh Day of January, 2005

JON W. DUDAS
*Director of the United States Patent and Trademark Office*